(12) United States Patent
Park et al.

(10) Patent No.: US 11,363,599 B1
(45) Date of Patent: Jun. 14, 2022

(54) INTERACTIVE CONTROL OF MOVING DEVICE SPEED AND PROCESSING SYSTEM OPERATING FREQUENCY

(71) Applicant: QUALCOMM Incorporated, San Diego, CA (US)

(72) Inventors: Hee Jun Park, San Diego, CA (US); Abhinav Goel, Lafayette, IN (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/207,845

(22) Filed: Mar. 22, 2021

(51) Int. Cl.
| | |
|---|---|
| *H04W 72/04* | (2009.01) |
| *H04W 84/18* | (2009.01) |
| *H04W 4/02* | (2018.01) |
| *H04W 4/029* | (2018.01) |
| *H04W 72/08* | (2009.01) |

(52) U.S. Cl.
CPC ....... *H04W 72/0453* (2013.01); *H04W 4/027* (2013.01); *H04W 4/029* (2018.02); *H04W 72/0406* (2013.01); *H04W 72/087* (2013.01); *H04W 84/18* (2013.01)

(58) Field of Classification Search
CPC . H04W 72/0453; H04W 4/029; H04W 4/027; H04W 72/0406; H04W 72/087; H04W 84/18
See application file for complete search history.

(56) References Cited

U.S. PATENT DOCUMENTS

| | | | |
|---|---|---|---|
| 2015/0172031 A1* | 6/2015 | Yeo | H04W 74/04 370/329 |
| 2018/0184468 A1* | 6/2018 | Chien | H04W 48/02 |
| 2021/0007080 A1* | 1/2021 | Zhou | H04W 72/02 |
| 2021/0297187 A1* | 9/2021 | Nammi | H04L 1/06 |

FOREIGN PATENT DOCUMENTS

| | | | | |
|---|---|---|---|---|
| WO | WO-2018064615 A1 * | 4/2018 | | H04L 1/0018 |

* cited by examiner

*Primary Examiner* — Joshua L Schwartz
(74) *Attorney, Agent, or Firm* — Qualcomm Incorporated

(57) ABSTRACT

Systems and methods may include indicating a processing latency requirement to an operating frequency controller of a moving device processing system, receiving an indication of the allowable operating frequency for the processing system, and changing a characteristic of movement of the moving device based on the allowable operating frequency indication. Some embodiments include receiving an indication of a processing latency requirement from a moving device control system, determining a target operating frequency to achieve the processing latency requirement, determining whether the target operating frequency exceeds an allowable operating frequency, and indicating the allowable operating frequency for the processing system to the moving device control system. Further embodiments include receiving an indication of a speed of the moving device, determining a target operating frequency for the processing system compatible with the indicated speed of the moving device, and changing an operating frequency of the processing system to the target operating frequency.

64 Claims, 20 Drawing Sheets

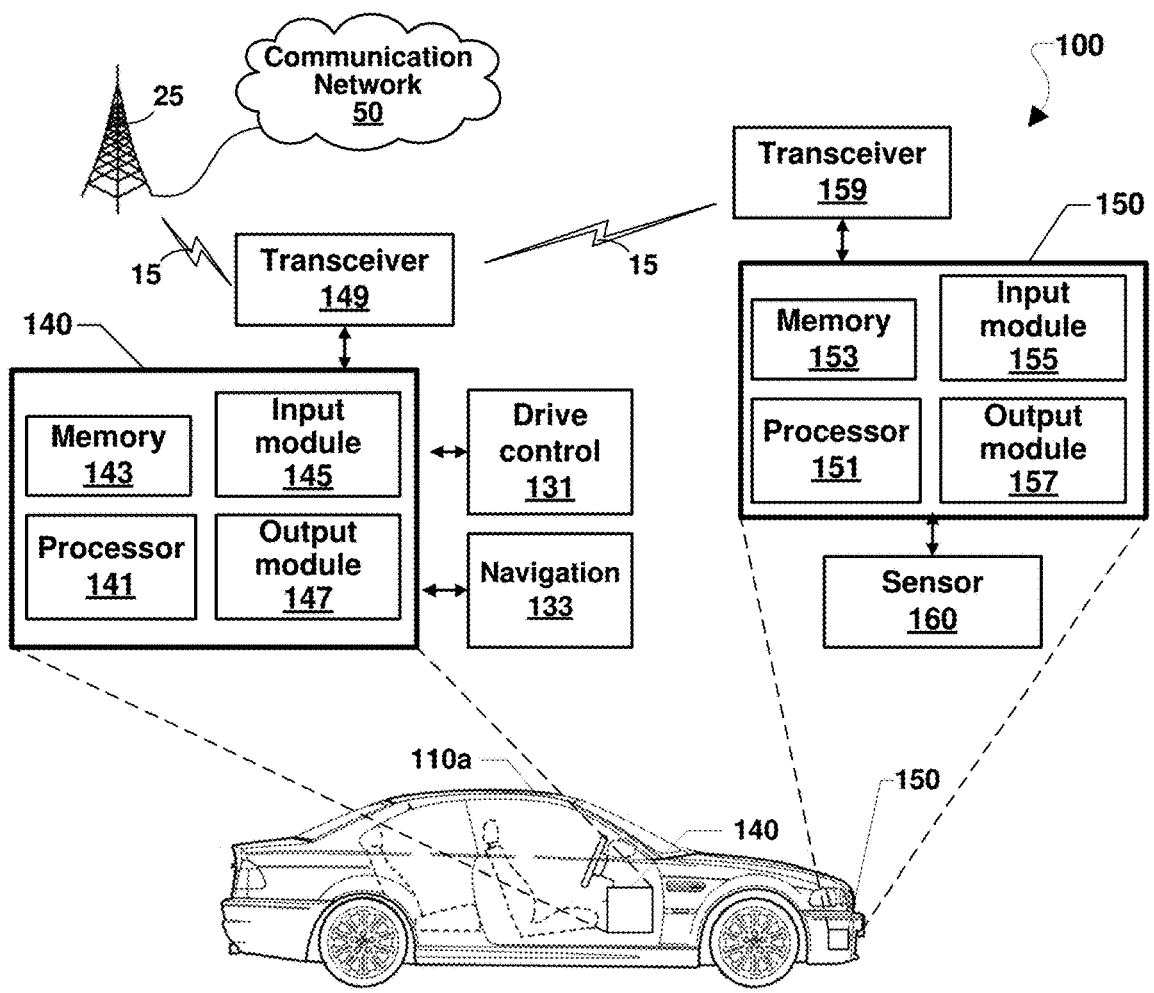
FIG. 1A
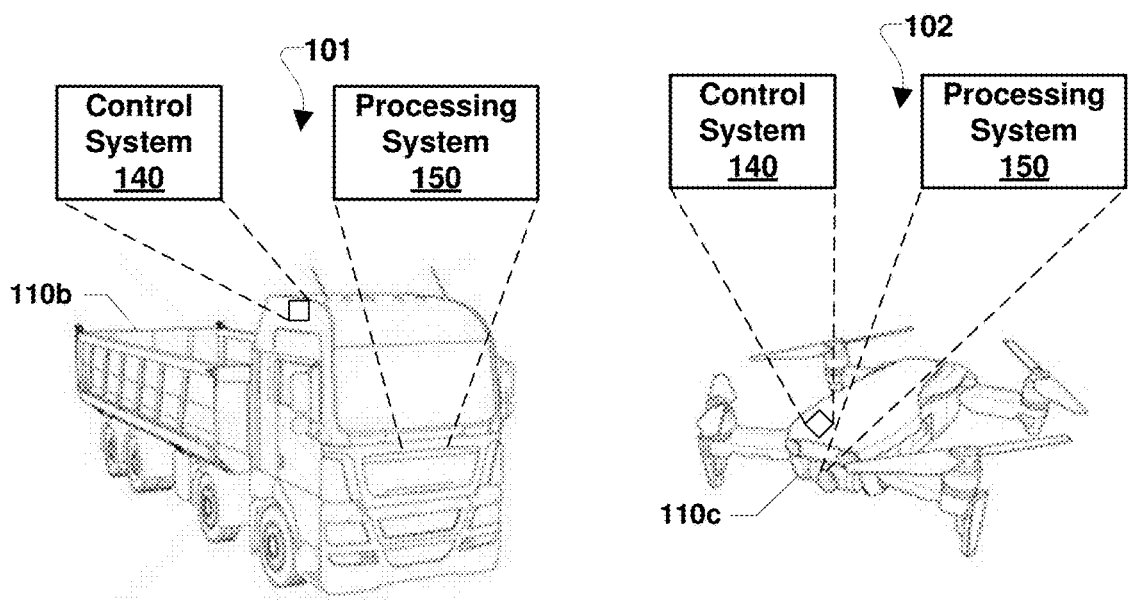
FIG. 1B
FIG. 1C

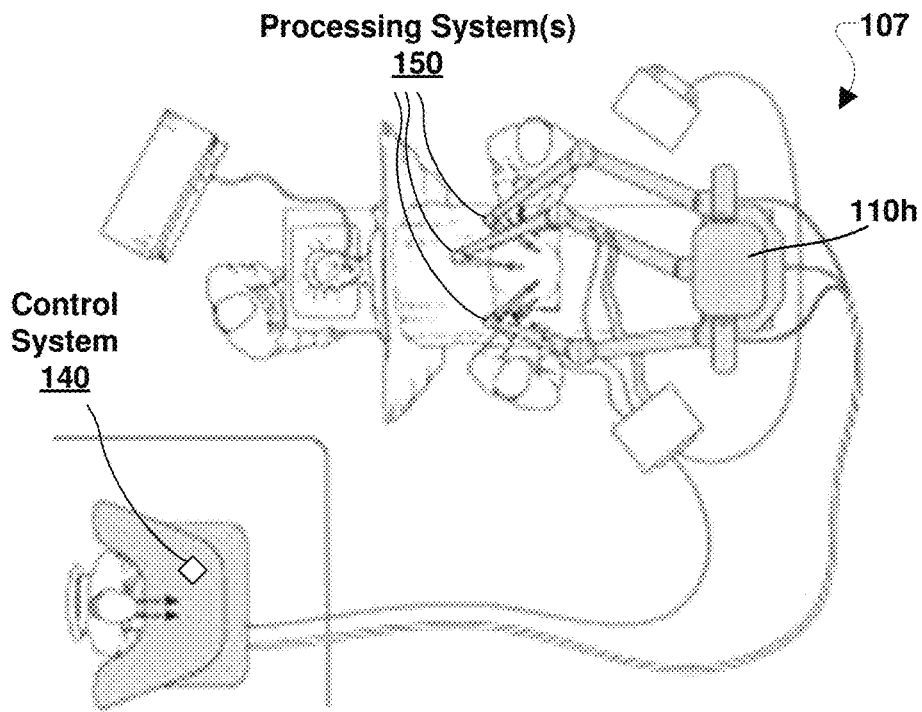
FIG. 1H
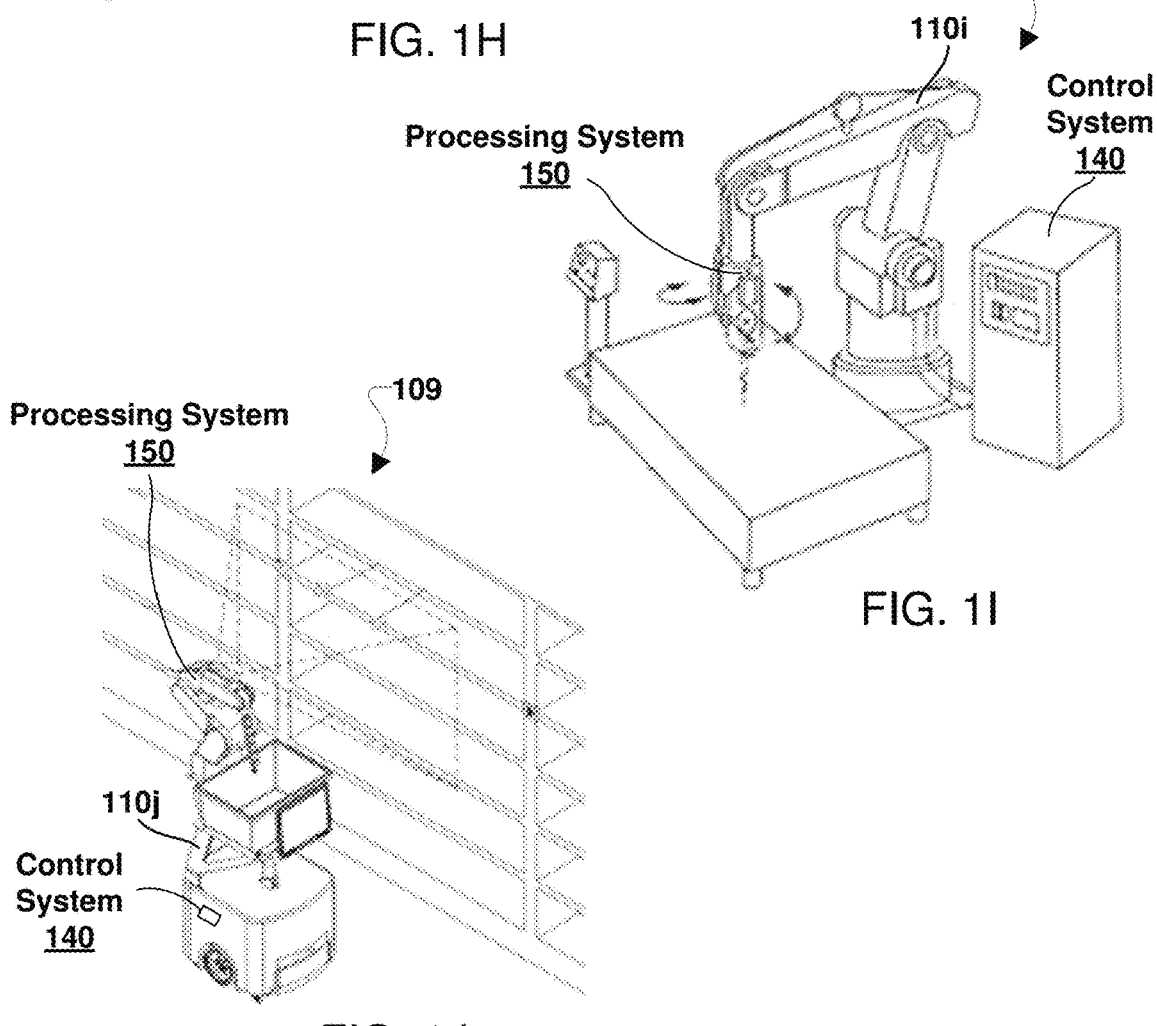
FIG. 1I
FIG. 1J

INTERACTIVE CONTROL OF MOVING DEVICE SPEED AND PROCESSING SYSTEM OPERATING FREQUENCY

BACKGROUND

There are many types of automated and semi-automated devices that rely on high speed processing by processors and computing devices systems for safety and mission critical computations. None limiting examples include autonomous and semi-autonomous vehicles that rely on vehicle computing systems for navigation and control functions, robots that rely on computing systems for movement controls of robotic actuators, and wearable electronics (e.g., augmented reality goggles and smart glasses) that rely on processing systems for image generation. While the processing speeds of modem computing systems enable levels of automation and control that were not possible a generation ago, the computing systems may not be able to support processing demands under all conditions. For example, to avoid overheating, modem computing devices typically include protective mechanisms that will reduce processing speeds when necessary to maintain processor circuitry within temperature limits. When this happens, the safety and mission critical operations required by the automated and semi-automated devices may be impacted.

SUMMARY

Various aspects include systems and methods executed by a processor of a moving device control system configured to interact with a processing system. Various aspects may include transmitting a processing latency requirement indication to an operating frequency controller of a moving device processing system, receiving an indication of the allowable operating frequency for the processing system in response to the transmitted processing latency requirement indication, and changing a characteristic of movement of the moving device based on the received indication of the allowable operating frequency.

Some aspects may further include determining a change in the characteristic of movement of the moving device that requires a change in a current processing latency of the operating frequency controller, in which the transmitted processing latency requirement indication may reflect the determined change in the characteristic of movement of the moving device. Some aspects may further include receiving at least one of a moving device target speed or remote object current speed, in which the determined change in the characteristic of movement of the moving device control system may be based on the received at least one of the moving device control system target speed or the remote object current speed. In some aspects, the transmitted processing latency requirement indication may correlate to a target speed of the moving device. In some aspects, changing the characteristic of movement of the moving device may include changing a speed of the moving device to a target speed associated with the received indication of the allowable operating frequency. In some aspects, the received indication of the allowable operating frequency may be configured to limit a maximum speed for the moving device. In some aspects, the transmitted processing latency requirement indication may include a latency requirement vote requesting a minimum latency from the processing system.

Various aspects may include systems and methods executed by a processor of a moving device processing system configured to interact with a control system. Various aspects may include receiving an indication of a processing latency requirement from a moving device control system, determining a target operating frequency to achieve the processing latency requirement, determining whether the target operating frequency exceeds an allowable operating frequency for the processing system, and transmitting an indication of the allowable operating frequency for the processing system to the moving device control system.

Some aspects may include changing an operating frequency of the processing system to the target operating frequency in response to determining that the target operating frequency does not exceed the allowable operating frequency, and changing a current operating frequency of the processing system to a value below that of the target operating frequency in response to determining that the target operating frequency exceeds the allowable operating frequency. In some aspects, the received indication of the processing latency requirement may correlate to a target speed of the moving device. In some aspects, the transmitted indication of the allowable operating frequency may be configured to direct the moving device control system to lower a target movement speed of the moving device. In some aspects, the transmitted indication of the allowable operating frequency may be configured to limit a maximum movement speed of the moving device. In some aspects, the received indication of the processing latency requirement may be include a latency requirement vote requesting a minimum latency from the processing system. Some aspects may further include determining the allowable operating frequency based on an operating frequency budget limiting operations of the processing system, in which the operating frequency budget may be based at least on one of a thermal, power, or load output limit of the processing system.

Further aspects include a processor of a control system and/or a controller of a processing system configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a moving device and/or a processing system and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIGS. 1A-1J are schematic diagrams illustrating example moving device systems suitable for implementing any of various embodiments.

DETAILED DESCRIPTION

Figure 1D:
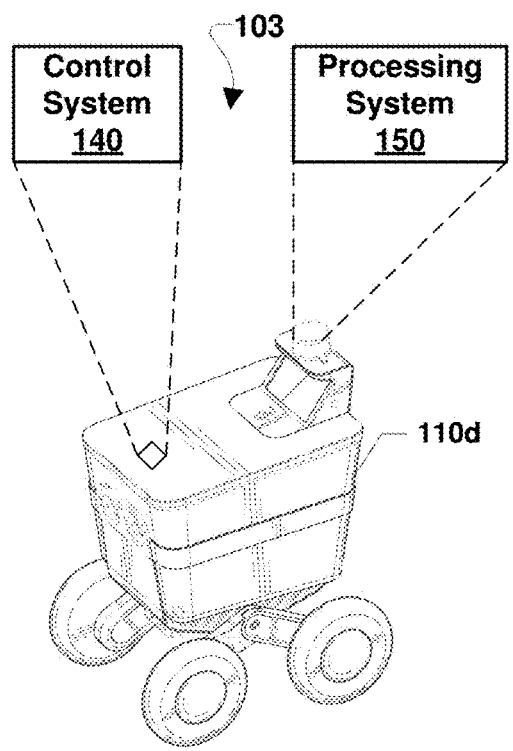

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Moving devices, such as vehicles, robots, and/or wearable electronics, that work in conjunction with an associated processing system may have conflicts in their respective operating requirements and/or limits. The moving device may have either limited resources or requirements on resources that tend to constrain performance, such as in terms of velocity, thermal output, power usage, and/or other operating constraints. The processing system may be part of the moving device and/or may control some operations of the moving device. The processing system may include one or more processors and/or one or more sensors that operate at a predetermined or variable operating frequency. For example, an autonomous or semi-autonomous vehicle (i.e., a moving device) may have a controller that manages movement of a vehicle propulsion and/or steering system (e.g., an advanced driver assistance system (ADAS)), in addition to a sensor (i.e., a processing system) providing support functionality for that movement and which functions at an operating frequency. As another example, a robotic arm (i.e., a moving device) may have a controller that manages movement thereof, while a processor (i.e., a processing system) may analyze and/or detect conditions in which the robotic arm operates. As a further example, a virtual reality (VR) headset (which is referred to as a moving device because the user's head moves) may have a controller that manages a sensory experience for the user who imparts movement on the headset (e.g., head turning or tilting), while a system on chip (SOC) (i.e., a processing system) may run various perception/neural networks that support operations of the headset.

The moving device may have operating requirements that dictate latency requirements of the processing system. For example, a vehicle may have a maximum driving speed (e.g., mandated by law or expected from an average driver/occupant) or a virtual reality headset may have a maximum head movement speed (e.g., expected from an average user). These maximum operating conditions may impose relatively short latency requirements on sensors and controllers used in those devices during such conditions. If a moving device operates at relatively high speed, a controller of that moving device may need to operate with low latency in order to react as quickly as possible to avoid dangers. Providing low latency requires a high operating frequency. Also, since operating frequencies are generally fixed, the short latency requirements under extreme conditions such as the top speed may dictate higher fixed operating frequencies under all conditions to ensure proper system reaction times when more extreme conditions arise. For systems in which the operating constraints are safety or mission critical, fixed relatively high operating frequencies are generally used because operating processing systems at lower frequencies may compromise safety or critical mission performance, and thus may be dangerous for the user and/or the system (e.g., for autonomous vehicles to avoid accidents). However, continuously operating processing systems at high operating frequencies may overly burden processors, sensors, and/or support systems that would benefit from running at lower operating frequencies. Also, some support systems may get throttled when operating at high operating frequencies too long, such as to prevent excessive energy consumption or heat generation, and such throttling may compromise system performance.

As used herein, the term "moving device" refers to one of various types of devices that are configured to move or be moved and include an onboard control system used to manage and/or control a function. Non-limiting examples of moving device include autonomous or semi-autonomous vehicles, including land vehicles (e.g., automobiles, trucks, buses, etc.), aircraft (e.g., manned aircraft, drones, etc.), waterborne vehicles, and spacecraft, any of which may operate with or without onboard human pilots/drivers. Further non-limiting examples include devices with moving or articulating parts, such as robots and robotic parts that have a control system managing movements of the robotic parts, such as agriculture equipment, manufacturing systems and robots, robotic testing systems, inventory control systems, and medical systems. Further examples of moving devices include wearable electronics that move as a result of wearer movements, such as smart watches, smart glasses, VR headsets, smart pendants, etc. A moving device may include an onboard computing device configured to operate or control device, with or without operating instructions and/or updates to instructions from a remote computing device via communications in accordance with various embodiments.

As used herein, the term "processing system" refers any device that upon receiving a set of inputs, produces a defined set of outputs. The inputs and outputs may represent data, facts, information, conditions, measurements, etc. For example, a processing system may include one or more sensors, electronic devices equipped with one or more processors and/or sensors, or just the one or more processors (e.g., a system on chip or a system in a package).

Various embodiments provide methods and systems that enable interactive control between the speed or movements of a moving device and the operating frequency of a processing system within or supporting the moving device. A moving device may be configured to transmit or otherwise provide a processing latency requirement indication to the processing system. The transmitted processing latency requirement indication may correlate to a target speed of the moving vehicle. In some embodiments, the transmitted processing latency requirement indication may include a latency requirement information or vote requesting a minimum latency from the processing system. Upon receipt of the processing latency requirement information, the processing system may determine a target operating frequency to achieve processing latency requirement. The processing system may also determine the allowable operating frequency based on an operating frequency budget limiting operations of the processing system. The operating frequency budget for the processing system may be based on limits of the processing system, such as the thermal, power, and/or load output limits thereof. The processing system may determine whether the target operating frequency exceeds an allowable operating frequency for the processing system, and transmit an indication of the allowable operating frequency for the processing system to the moving device control system. If the target operating frequency does not exceed or equals the allowable operating frequency for the processing system, the transmitted indication of the allowable operating frequency for the processing system may be equal to the target operating frequency. Also, the processing system may change the operating frequency of the processing system to the target operating frequency in response to determining that the target operating frequency does not exceed the allowable operating frequency. If the target operating frequency exceeds the allowable operating frequency for the processing system, the transmitted indication of the allowable operating frequency for the processing system may be less than the target operating frequency. Also, the processing system may change the current operating frequency of the processing system to a value below that of the target operating frequency in response to determining that the target operating frequency exceeds the allowable operating frequency.

The transmitted processing latency requirement indication may correlate to a target speed of the moving device. Also, the transmitted processing latency requirement indication may include a latency requirement vote requesting a minimum latency from the processing system. After transmitting the processing latency requirement indication to the operating frequency controller, the control system may receive from the processing system an indication of the allowable operating frequency of the processing system. The received indication of the allowable operating frequency may be configured to limit a maximum speed for the moving device. Thus, the control system may change a characteristic of movement of the moving device based on the received indication of the allowable operating frequency. Changing the characteristic of movement of the moving device may include changing a speed of the moving device to a target speed associated with the received indication of the allowable operating frequency. The control system may determine a change in the characteristic of movement of the moving device that requires a change in a current processing latency of the operating frequency controller, in which the transmitted processing latency requirement indication reflects the determined change in the characteristic of movement of the moving device. Prior to transmitting the processing latency requirement indication, the control system may receive at least one of a moving device target speed or remote object current speed. The determined change in the characteristic of movement of the moving device control system may be based on the received at least one of the moving device control system target speed or the remote object current speed.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high-speed communication circuitry and packaged in close proximity, such as on a single motherboard or in a single wireless device. The proximity of the SOCs facilitates high speed communications and the sharing of memory and resources.

As used herein, the terms "component," "system." "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Various embodiments may be implemented within a variety of moving devices having a control system that interacts with a processing system. FIGS. 1A-1J illustrate several examples of moving device systems 100-109 in which the control system and processing system dynamically interact to adjust operating frequency and/or moving device speed.

Referring to FIG. 1A, an example moving device system 100 includes a moving device 110a in the form of an autonomous or semiautonomous passenger vehicle, which operates with a control system 140 in coordination with a processing system 150. The control system 140 may be configured to manage operations of the moving device 110a such as movement using a vehicle propulsion and/or steering systems. For example, the control system 140 may be an ADAS vehicle speed controller configured to regulate a speed and/or driving direction of the moving device 110a. The control system 140 may include various circuits and devices used to control operations thereof. In the example illustrated in FIG. 1A, the control system 140 includes one or more processors 141, memory 143 (i.e., electronic storage), an input module 145, and an output module 147. In addition, the control system 140 may include communication lines or ports, such as transceiver 149, to enable the exchange of information with the processing system, a network, external resources, and/or other computing platforms, as well as drive control components 131 and navigation components 133 of the moving device 110a.

The processing system 150 is illustrated in the form of an SOC receiving inputs from one or more sensors 160 (e.g., temperature and/or power/load monitoring sensors) and may interact with the control system 140. Like the control system 140, the processing system 150 may include various circuits and devices used to control operations thereof. In the example illustrated in FIG. 1A, the processing system 150 includes one or more processors 151, memory 153 (i.e., electronic storage), an input module 155, and an output module 157. In addition, the processing system 150 may be coupled to and configured to control operations of the one or more sensors 160.

Memory 143, 153 may include non-transitory computer readable medium in the form of memory. Such memory may include system storage that is provided integrally (i.e., substantially non-removable) with the control system 140 and/or the processing system 150. Also, such memory may include removable storage that is removably connectable to the control system 140 and/or the processing system 150, such as via a port (e.g., a Universal Serial Bus (USB) port, a FireWire port, etc.) or a disk drive. Memory (e.g., 143, 153, 220, 258) may also include one or more of optically readable storage media (e.g., optical disks, etc.), magnetically readable storage media (e.g., magnetic tape, magnetic hard drive, floppy drive, etc.), electrical charge-based storage media (e.g., EEPROM. RAM, etc.), solid-state storage media (e.g., flash drive, etc.), and/or other electronically readable storage media. Memory (e.g., 143, 153, 220, 258) may include one or more virtual storage resources (e.g., cloud storage, a virtual private network, and/or other virtual storage resources). Memory (e.g., 143, 153, 220, 258) may store software algorithms, information determined by processor(s) 141, 151, information received from the control system 140 or the processing system 150, respectively, that enables the control system 140 or the processing system 150, respectively to function as described herein.

Processor(s) 141, 151 may be configured to provide information processing capabilities in the control system 140 or the processing system 150, respectively. As such, processor(s) 141, 151 may include one or more of a digital processor, an analog processor, a digital circuit designed to process information, an analog circuit designed to process information, a state machine, and/or other mechanisms for electronically processing information. Although processor(s) 141, 151 are each shown in FIG. 1A as a single entity, this is for illustrative purposes only. In some implementations, processor(s) 141, 151 may include a plurality of processing units. These processing units may be physically located within the same device, or processor(s) 141, 151 may represent processing functionality of a plurality of devices, remote and/or local to one another, operating in coordination.

In accordance with various embodiments, the processing system 150 may dynamically adjust the operating frequency of the one or more processors 151 according to a speed of the moving device 110a. Conventional processing systems generally limit processing to strict thermal and power constraints, particularly for extreme operating conditions (e.g., operations involving prolonged and maximized processing speeds). For example, the processor(s) 151 may be throttled when rare high temperatures or peak currents are detected. Such limits may prevent overheating or unnecessarily high expenditures of power in one or more portions of the control system 140 or related components. However, such limits may run counter to the needs of the control system 140 from time to time. For example, when an autonomous or semi-autonomous vehicle 110a is operating at high speed, which may be directed by the ADAS, the control system 140 may need the processing system 150 to operate with low latencies. Quick reaction times for vehicles traveling at high speeds is important for safety. Thus, if the processing system 150 imposes lower operating frequencies (e.g., to meet thermal or power constraints), the resulting increase in processing latencies may result in dangerous conditions or reduced safety. Alternatively, when processing capability must be throttled for various reasons, a speed of an autonomous or semi-autonomous vehicle 110a may be limited according to a maximum processing latency of the processing system 150 or the time required to process sensor inputs by the processing system 150 in order to avoid dangerous conditions. In conventional systems, the control system 140 and the processing system 150 do not coordinate operating frequencies based on speed. By enabling interactive control of the operating frequency of the processing system 150 based on a speed of the moving device 110a, various embodiments may optimize energy efficiencies, while still enabling mission critical operations to work well when needed.

In various embodiments, the control system 140 and the processing system 150 may negotiate an allowable operating frequency of the processing system 150 using processing latency voting. Processing latency voting may consider operating frequency that corresponds to a target operating speed of an autonomous or semi-autonomous vehicle 110a when determining whether that corresponding operating frequency exceeds an allowable operating frequency. Using processing latency voting, the processor 141 of the control system 140 may transmit a processing latency requirement indication to the processor 151 of the processing system 150. The processing latency requirement indication may request a minimum latency from the processing system 150. The minimum latency may correspond to a latency level needed to be maintained for a target speed of the autonomous or semi-autonomous vehicle 110a to be safely achieved or maintained. The processing latency requirement indication may be correlated to a target vehicle speed. Additional factors may be considered during processing latency voting, such as the speed of nearby objects, which may establish the relative speed of the vehicle 110a, and/or the perception time needed by the control system 140 to effectively react under current conditions. Also, processing latency voting may involve the processor 151 of the processing system 150 transmitting a signal to the control system 140 indicating the maximum speed allowable for the vehicle 110a. Processing latency voting may still use limits on a processing frequency of the processing system 150 but may consider increasing the current operating frequency of the processing system 150 if the target operating frequency does not exceed that limit. Further, processing latency voting may involve limiting a speed of the vehicle 110*a* if the limit on the processing frequency would otherwise need to be exceeded.

The transceivers 149, 159 may provide a communication link 15 that may be wired and/or wireless to the processors 141, 151, respectively, and/or other components thereof. In some embodiments, the communication link 15 may be a bidirectional or unidirectional communication link and may use one or more communication protocols. In some embodiments, the transceivers 149, 159 may enable the vehicle 110*a* to communicate with another vehicle through another communication link, which may also be a bidirectional or unidirectional communication link and may use one or more communication protocols.

The transceivers 149, 159 may be configured for wired and/or wireless communication by exchanging signals in the communication link 15 (e.g., command signals for controlling maneuvering, messages for optimizing control systems, exchanging signals from navigation facilities, via one or more base stations 25, a communication network 50, and/or other component and/or network transceivers. The communication link 15 may include a plurality of carrier signals, frequencies, or frequency bands, each of which may include a plurality of logical channels. Also, the communication link 15 may utilize one or more radio access technologies (RATs). Examples of RATs that may be used in a communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various communication links 15 within the communication system may include medium range protocols such as Wi-Fi, LTE-U, LTE-Direct, LAA, MuLTEfire, and relatively short-range RATs such as ZigBee, Bluetooth, and Bluetooth Low Energy (LE).

The input modules 145, 155 may receive sensor data from one or more vehicle sensors 160 as well as electronic signals from other components, including the drive control components 131 and the navigation components 133. Sensors 160 may detect the presence, direction, distance, and/or speed of other vehicles, individuals, and/or objects, by sending out pulses of high-frequency electromagnetic waves that are reflected off the object back to the source.

The output modules 147, 157 may be used to communicate with or activate various components of the vehicle 110*a*, including the transceivers 149, 159, the drive control components 131, the navigation components 133, and the sensor(s) 160.

The control system 140 may be coupled to the drive control components 131 to control physical elements of the vehicle 110*a* related to maneuvering and navigation of the vehicle, such as the engine, motors, throttles, steering elements, brakes or deceleration elements, and the like. The drive control components 131 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control system 140 may be coupled to the navigation components 133 and may receive data from the navigation components 133 and be configured to use such data to determine the present position and orientation of the moving device 110*a*, as well as an appropriate course toward a destination. In various embodiments, the navigation components 133 may include or be coupled to a global navigation satellite system (GNSS) receiver system (e.g., one or more Global Positioning System (GPS) receivers) enabling the moving device 110*a* to determine its current position using GNSS signals. Alternatively, or in addition, the navigation components 133 may include radio navigation receivers for receiving navigation beacons or other signals from radio nodes (e.g., the base station 25), such as Wi-Fi access points, cellular network sites, radio stations, remote computing devices, other vehicles, etc. Through control of the drive control components 131, the processor 141 may control the moving device 110*a* to navigate and maneuver. The processor 141 and/or the navigation components 133 may be configured to communicate with a remote computing device (e.g., a server) on a network (e.g., the Internet) using communication links to receive commands to control maneuvering, receive data useful in navigation, provide real-time position reports, and assess other data.

While the control system 140 is described as including separate components, in some embodiments some or all of the components (e.g., the processor 141, the memory 143, the input module 145, the output module 147 and/or the transceiver 149) may be integrated in a single device or module, such as an SOC processing device. Such an SOC processing device may be configured for use in vehicles and be configured, such as with processor-executable instructions executing in the processor 141, to perform operations of various embodiments.

Figure 1E:
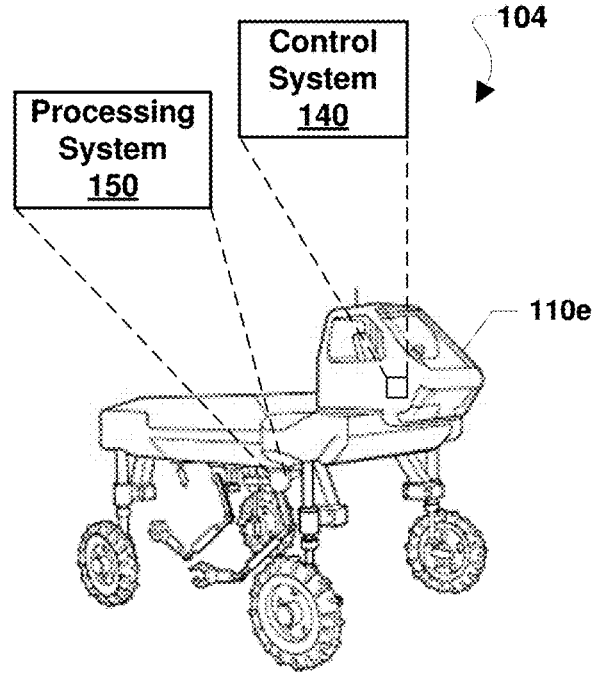

FIG. 1B illustrates a moving device system 101 including a moving device 110*b* in the form of an autonomous or semi-autonomous truck. FIG. 1C illustrates a moving device system 102 including a moving device 110*c* in the form of an autonomous or semi-autonomous unmanned aerial vehicle (UAV). FIG. 1D illustrates a moving device system 103 including a moving device 110*d* in the form of an autonomous or semi-autonomous delivery robot. FIG. 1E illustrates a moving device system 104 including a moving device 110*e* in the form of an autonomous or semi-autonomous agricultural harvesting robot. Like the vehicle 110*a* described with reference to FIG. 1A, moving devices 110*b*, 110*c*, 110*d*, and 110*e* may include a control system 140 and a processing system 150. Each control system 140 may be configured to manage operations of the respective moving devices 110*b*, 110*c*, 110*d*, and 110*e*. Each processing system 150 may be configured to receive inputs from one or more sensors (e.g., 160) and may interact with the control system 140.

Figure 1F:
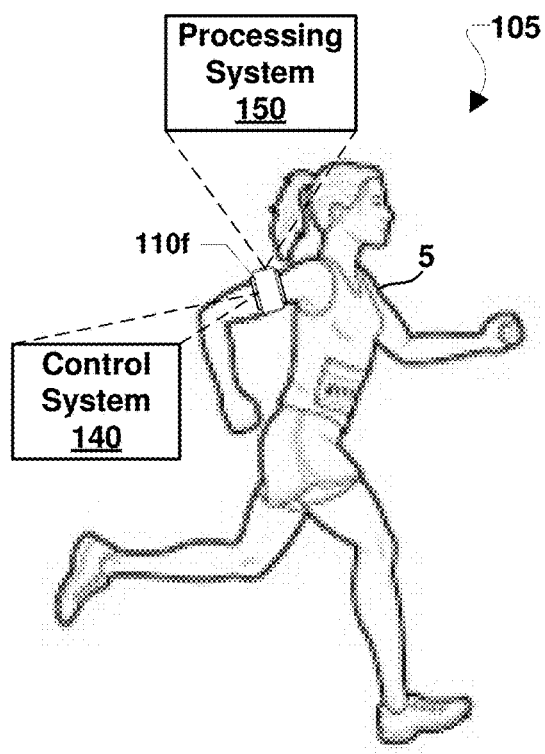

FIG. 1F illustrates a moving device system 105 including a moving device 110*f* in the form of a mobile computing device (e.g., a cellphone). Unlike moving devices 110*a*, 110*b*, 110*c*, 110*d*, and 110*e*, described with respect to FIGS. 1A-1E, the moving device 110*f* is not self-propelled. Rather, the moving device 110*f* is moved by a user 5. Also, the moving device 110*f* may house both the control system 140 and the processing system 150. For example, the control system 140 may be an SIP controlling many of the main operations of the moving device 110*f*, while the processing system 150 may be one or more sensors (e.g., lidar, proximity, motion, etc.). For example, a lidar sensor may be used to map-out terrain in the vicinity of the user 5. When the user 5 is running and/or the terrain or environment around the user 5 is changing rapidly, the lidar functions may be processing-intensive, which may require the processing system 150 to impose thermal and/or power limits thereon. By using interactive controls between the processing system 150 and the control system 140, various embodiments may enhance safety for the user 5 and efficiencies of the moving device 110f.

Figure 1G:
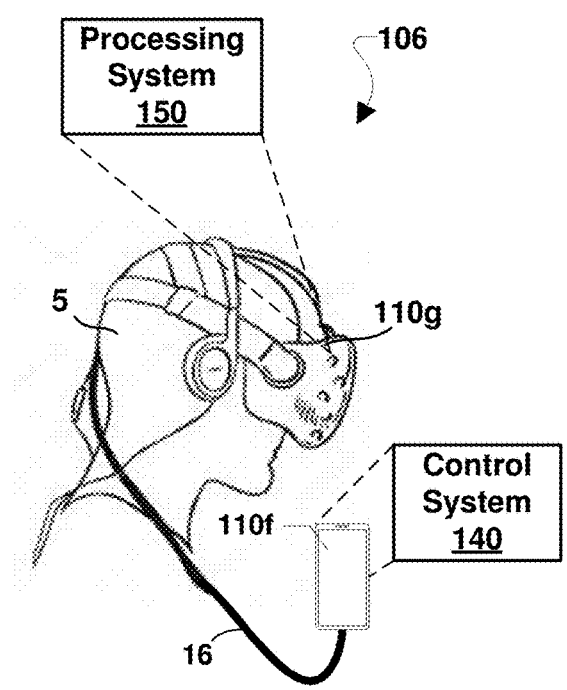

FIG. 1G illustrates a moving device system 106 including a moving device 110g in the form of a virtual reality (VR) and/or augmented reality (AR) headset. Like moving device 110f described with reference to FIG. 1F, the moving device 110g is not self-propelled. Rather, the moving device 110g is moved by the head and neck movements of a user 5. Also, like moving device 110f, the moving device 110g may house both the control system 140 and the processing system 150. In addition, or alternatively, moving device 110g may work with another computing device, such as the moving device 110f. For example, the processing system 150 of the moving device 110g may be coupled to (e.g., via a cable 16) and work in conjunction with a control system (e.g., 140) of the other device 110f or vice versa.

FIG. 1H illustrates a moving device system 107 including a moving device 110h in the form of a surgical robot. With reference to FIG. 1I, a moving device system 108 is illustrated including a moving device 110i in the form of a manufacturing robot. FIG. 1J illustrates a moving device system 109 including a moving device 110j in the form of a robotic inventory retrieval/storage robot. Unlike the moving devices 110a, 110b, 110c, 110d, 110e, 110f, and 110g described with reference to FIGS. 1A-1G, moving devices 110h, 110i, and 110j may include a control system 140 that is remote and does not move, while a more local processing system 150 moves or has parts that move (e.g., the robotic arms move). In some embodiments, the moving devices 110h, 110i, and 110j may not include a computer processor (e.g., an SOC or SIP), but only have sensors, motors, and articulating elements. Thus, each control system 140 may be configured to manage operations of the respective moving devices 110h, 110i, and 110j, while each processing system 150 is configured to receive inputs from one or more sensors (e.g., 160) and may interact with the control system 140.

Figure 2:
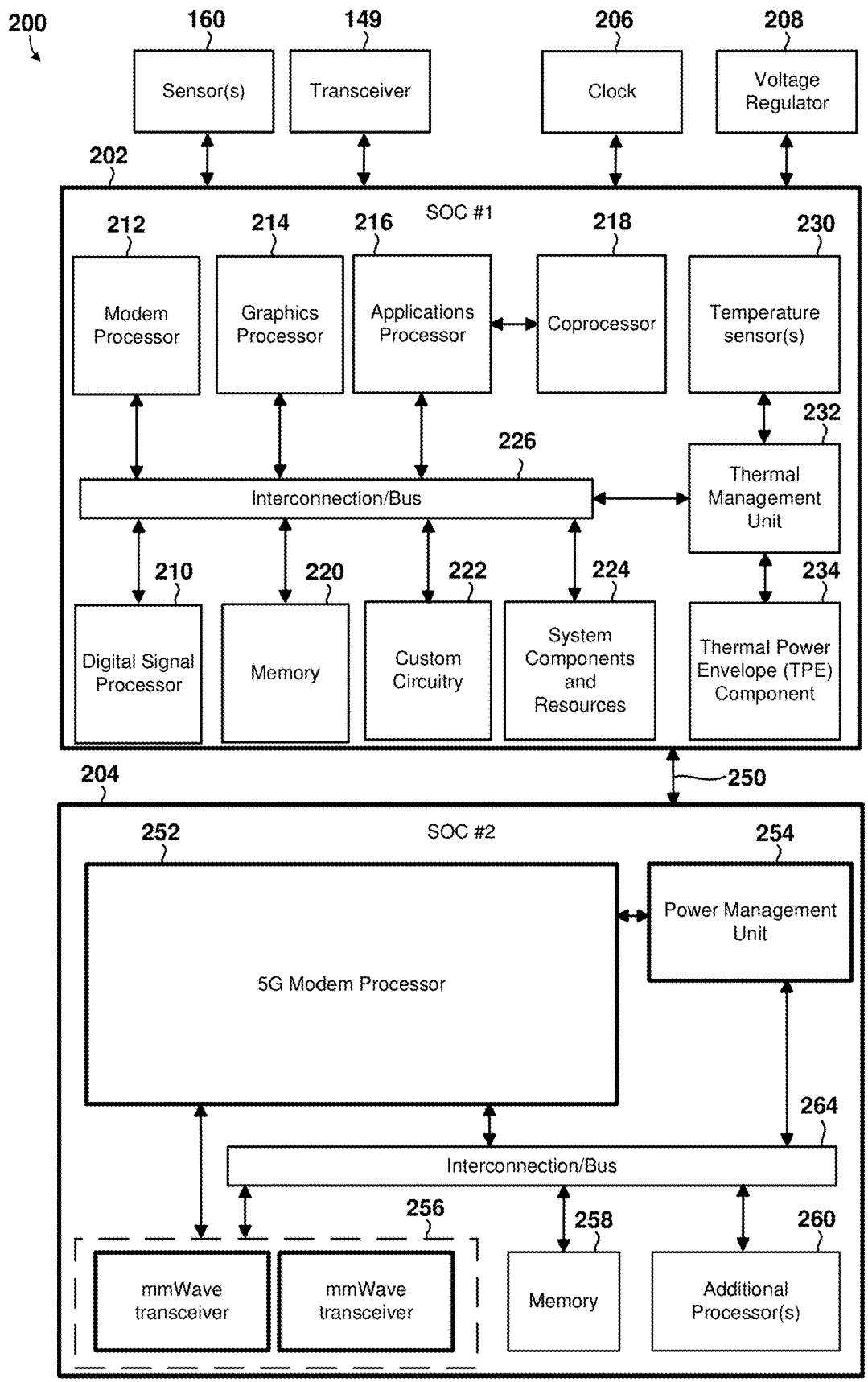
FIG. 2 is a component block diagram illustrating an example system in package suitable for implementing any of the various embodiments.

FIG. 2 is a component block diagram illustrating an example control system in the form of SIP 200 suitable for implementing any of the various embodiments. Various embodiments may be implemented on a number of single processor and multiprocessor computer systems, including an SOC or an SIP.

With reference to FIGS. 1A-2, the illustrated example SIP 200 includes two SOCs 202, 204 coupled to a clock 206, a voltage regulator 208 and a transceiver 149. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as the transceiver 149, sensor(s) 160, a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
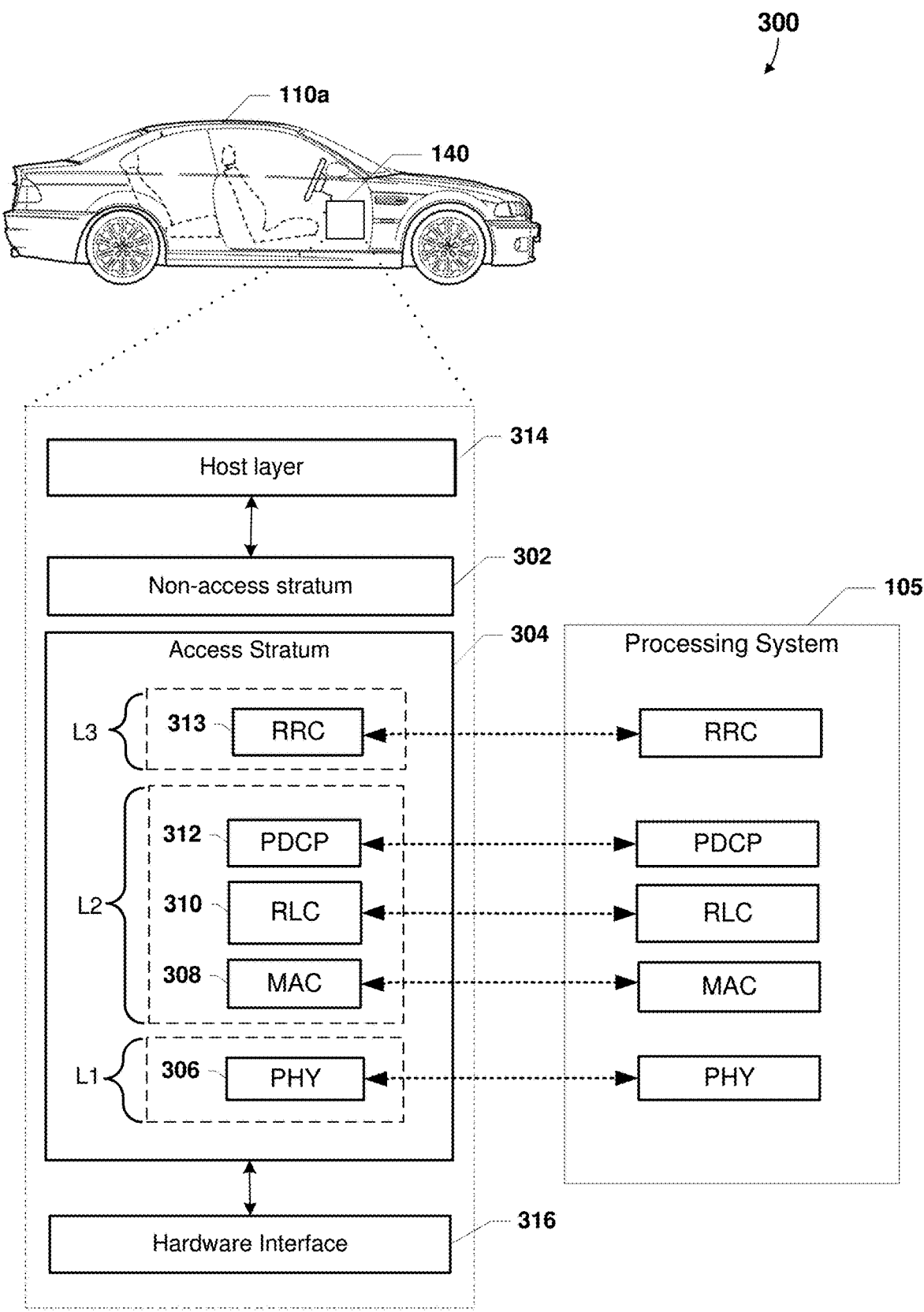
FIG. 3 is a component block diagram illustrating a software architecture including a radio protocol stack for the control system and/or the processing system suitable for implementing any of the various embodiments.

FIG. 3 is a software architecture diagram illustrating a non-limiting example of a software architecture 300 including a radio protocol stack for the user and control planes in wireless communications suitable for implementing any of the various embodiments. With reference to FIGS. 1A-3, the control system 140 may implement a software architecture similar to the illustrated software architecture 300 to facilitate control system interactions with a processing system. In various embodiments, layers in the software architecture 300 may form logical connections with corresponding layers in software of the processing system 150. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different subscriber identity module (SIM) (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the control system 140 (e.g., SIM(s) 204) and its vehicle. The AS 304 may include functions and protocols that support communications between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including a physical downlink control channel (PDCCH) and a physical downlink shared channel (PDSCH), or sidelink channels such as a physical sidelink control channel (PSCCH) and a physical sidelink shared channel (PSSCH).

In the user and control planes. Layer 2 (L2) of the AS 304 may be responsible for the link between the control system 140 and the processing system 150 over the physical layer 306. In the various embodiments. Layer 2 may include a media access control (MAC) sublayer 308, a radio link control (RLC) sublayer 310, and a packet data convergence protocol (PDCP) 312 sublayer, each of which form logical connections terminating at the processing system 150.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the control system 140 and the processing system 150.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the control system 140. In some embodiments, application-specific functions provided by the at least one host layer 314 may provide an interface between the software architecture and the general-purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 30) may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
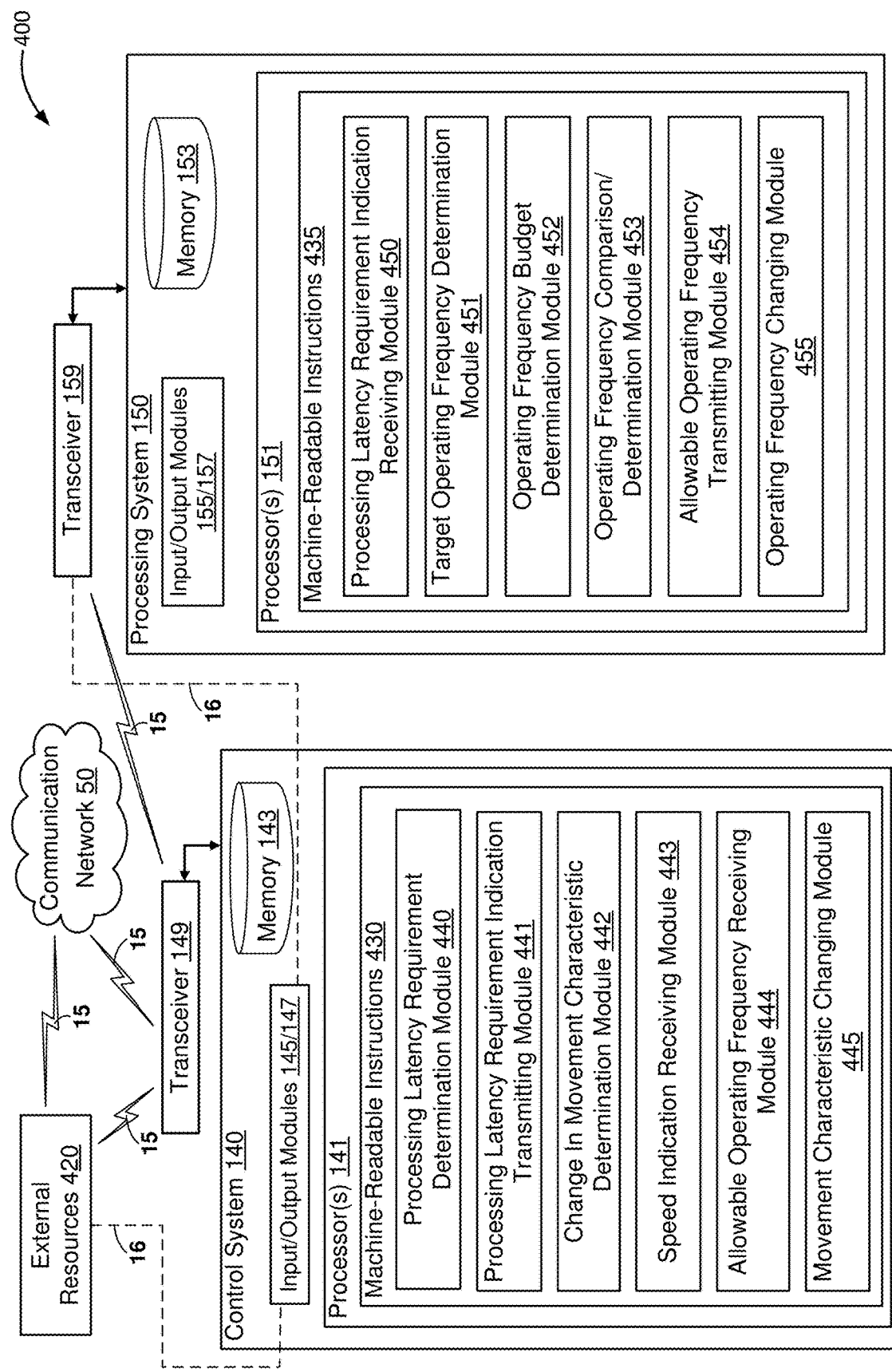
FIGS. 4A-4C are component block diagrams illustrating moving device systems configured for interactive control of moving device speed and processing system operating frequency in accordance with various embodiments.

FIG. 4A is a component block diagram illustrating a moving device system 400. With reference to FIGS. 1A-4A, the moving device system 400 may be configured with a control system 140 that interacts with a processing system 150 in accordance with various embodiments. Each of the control system 140 and the processing system 150 may include a plurality of hardware, software, and/or firmware components operating together to provide the functionality attributed herein to the control system 140 and the processing system 150 of the moving device (e.g., 110a, 110b, 110c, 110d, 110e, 110f, 110g, 110h, 110i, 110j).

External resources 420 may include one or more remote computing device (e.g., a server), sensor(s), or other resources configured to support operations of the control system 140 and/or the processing system 150. The external resources 420 may communicate with the control system 140 and/or the processing system 150 using one or both of the transceivers 149, 159, the communication network 50, via the wireless communication links 15, via one or more wired communication link 16 (if available), and/or a combination thereof.

The control system 140 may be configured by machine-readable instructions 430, which may include one or more instruction modules. The instruction modules may include computer program modules. In particular, the instruction modules may include one or more of a processing latency requirement determination module 440, a processing latency requirement indication transmitting module 441, a change in movement characteristic determination module 442, a speed indication receiving module 443, an allowable operating frequency receiving module 444, a movement characteristic changing module 445, and/or other instruction modules.

The processing latency requirement determination module 440 may be configured to determine a processing latency requirement indication for the mobile device. The determined processing latency requirement indication may correlate to a target speed of the moving device. Thus, the determined processing latency requirement indication may actually represent a scalar value of a target speed the control system 140 has determined the moving device should attain. The scalar value may be easily converted to an associated operating frequency and/or processing latency. Also, the target speed may be a relative velocity that considers the velocity of other moving objects (e.g., other moving devices) in the vicinity of the subject moving device.

Alternatively, the determined processing latency requirement indication may represent a minimum processing latency value needed by the control system 140 to safely perform a maneuver and/or otherwise operate as needed. As a further alternative, the determined processing latency requirement indication may represent a minimum operating frequency needed by the control system 140 to safely perform a maneuver and/or otherwise operate as needed.

In a non-limiting example, means for implementing the machine-readable instructions 430 of the processing latency requirement determination module 440 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The processing latency requirement indication transmitting module 441 may be configured to transmit, from the control system 140 to the processing system 150, a message regarding a processing latency of the processing system 150. The transmitted message may reflect the processing latency requirement indication determined by the processing latency requirement determination module 440. Alternatively, or additionally, the transmitted processing latency requirement indication may include a latency requirement vote requesting a minimum latency from the processing system. In some embodiments, the transmitted processing latency requirement indication may reflect a determined change in the characteristic of movement of the moving device.

In a non-limiting example, means for implementing the machine-readable instructions 430 of the processing latency requirement indication transmitting module 441 may include the transceiver 149, a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the control system 140 and/or the processing system 150.

The change in movement characteristic determination module 442 may be configured to determine a change in the characteristic of movement of the moving device that requires a change in a current processing latency of the operating frequency controller. The change in the characteristic of movement of the moving device may include changing a speed of the moving device to a target speed associated with the received indication of the allowable operating frequency. Also, changes in speed, as referred to herein, may be scalar or vector values. In some embodiments, the change in movement characteristic determination module 442 may be configured to determine a change in the characteristic of movement of the moving device that requires a change in a current processing latency of the operating frequency controller. In some embodiments, the determined change in the characteristic of movement of the moving device control system may be based on a received moving device control system target speed and/or a remote object current speed. In this way, the determined change may be based on characteristics of movement of the moving device itself and/or relative to other objects. Thus, the determined change may indicate a change in speed of the moving device, which may be determined from inputs, such as the allowable operating frequency of the processing system 150 (e.g., reflecting a maximum speed that may be safely supported by the processing system 150), a target moving device speed, and/or the speed of other objects within the vicinity of the moving device.

In a non-limiting example, means for implementing the machine-readable instructions 430 of the change in movement characteristic determination module 442 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The speed indication receiving module 443 may be configured to receive an indication of the allowable operating frequency for the processing system 150 in response to the transmitted processing latency requirement indication. The indication of the allowable operating frequency may have been transmitted from the processing system 150. The received indication of the allowable operating frequency may be configured to limit a maximum speed for the moving device. That maximum speed may be equal to the target speed reflected in the processing latency requirement indication. Alternatively, the processing system 150 may not be able to operate at the level of processing latency needed to operate at the target speed from the processing latency requirement indication, in which case the allowable operating frequency may be lower than the target speed. In addition, the speed indication receiving module 443 may be configured to receive at least one of a moving device target speed or a remote object current speed.

In a non-limiting example, means for implementing the machine-readable instructions 430 of the speed indication receiving module 443 may include the transceiver 149, a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The allowable operating frequency receiving module 444 may be configured to receive an indication of the allowable operating frequency for the processing system in response to transmitting the processing latency requirement indication. The received indication of the allowable operating frequency may be configured to limit a maximum speed for the moving device, which means the processing system 150 has imposed a speed limit on the moving device based on the allowable operating frequency.

In a non-limiting example, means for implementing the machine-readable instructions 430 of the allowable operating frequency receiving module 444 may include the transceiver 149, a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The movement characteristic changing module 445 may be configured to change a characteristic of movement of the moving device based on the received indication of the allowable operating frequency. For example, in response to the change in movement characteristic determination module 442 determining that the moving device needs to operate at a target speed that is higher than the current speed, the movement characteristic changing module 445 may activate the appropriate systems to make that change happen. In addition, the movement characteristic changing module 445 may be configured to implement other changes, other than speed, such as changes in direction, driving style, the rate of change of movements, etc.

In a non-limiting example, means for implementing the machine-readable instructions 430 of the movement characteristic changing module 445 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

Like the control system 140, the processing system 150 may also be configured by machine-readable instructions 435, which may include one or more instruction modules. The instruction modules may include computer program modules. In particular, the instruction modules may include one or more of a requirement indication receiving module 450, a target operating frequency determination module 451, an operating frequency budget determination module 452, an operating frequency comparison/determination module 453, an allowable operating frequency transmitting module 454, and an operating frequency changing module 455, and/or other instruction modules.

The requirement indication receiving module 450 may be configured to receive a processing latency requirement indication from the control system 140. For example, the received indication of the processing latency requirement may represent an actual measure of processing latency, a measure of an operating frequency for the processing system 150 that corresponds to a particular processing latency, a scalar measurement of moving device speed that corresponds to a particular processing latency or operating frequency, or the like. Thus, the received indication of the processing latency requirement may correlate to a target speed of the moving device. In some embodiments, the received indication of the processing latency requirement may include a latency requirement vote requesting a minimum latency from the processing system.

In a non-limiting example, means for implementing the machine-readable instructions 430 of the requirement indication receiving module 450 may include the transceiver 159, a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The target operating frequency determination module 451 may be configured to determine a target operating frequency to achieve the processing latency requirement. For example, based on a target moving device speed, processing latency vote, or other processing latency requirement indication received from the control system, the processing system may determine the target operating frequency. If the target moving device speed is low enough, the target operating frequency determination module 451 may determine a current operating frequency may be lowered, while still meeting safety requirements, and saving energy. Alternatively, if the target moving device speed is high, the target operating frequency determination module 451 may determine a current operating frequency needs to be raised, if possible.

In a non-limiting example, means for implementing the machine-readable instructions 430 of the target operating frequency determination module 451 may include a processor (e.g., 210, 212.214, 216, 218, 252, 260, 141, 151) of a processing device (e.g., 140, 150) that may use the memory (e.g., 143, 153, 220, 258), external resources 420, and/or one or more other components of the processing system 150.

The operating frequency budget determination module 452 may be configured to determine the allowable operating frequency based on an operating frequency budget limiting operations of the processing system. For example, the operating frequency budget may preprogrammed or determined from limits on thermal, power, and/or load outputs by/of the processing system. In some embodiments, the operating frequency budget may have conditions, such as one or more higher budget for emergency and/or special circumstances. Thus, the processing system may determine whether emergency and/or special circumstances exist in order to determine the appropriate operating frequency budget.

In a non-limiting example, means for implementing the machine-readable instructions 430 of the operating frequency budget determination module 452 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The operating frequency comparison/determination module 453 may be configured to determine whether the target operating frequency exceeds an allowable operating frequency for the processing system. Thus, the operating frequency comparison/determination module 453 may also be configured to determine both the current operating frequency and the allowable operating frequency for the processing system 150. The current operating frequency of the processing system 150 may be determined (i.e., calculated) according to inputs such as the thermal/power/load target (i.e., budget) and measurements from conventional temperature sensors and/or power/load monitoring systems. The allowable operating frequency may be determined using processing latency voting, such as from an ADAS vehicle speed controller. For example, the actual operating frequency ($OF_{Actual}$) may be determined using the following formula:

$$OF_{Actual} = \min(c_1/V_{PL}) \qquad (1).$$

In equation (1), $c_1$ is a system dependent constant and $V_{PL}$ reflects a value corresponding to a processing latency vote. Alternatively, other formulas (i.e., functions) may be used to determine the actual operating frequency.

In some embodiments, the allowable operating frequency for the processing system may be determined by the operating frequency comparison/determination module 453 based on the operating frequency budget determined by the operating frequency budget determination module 452. For example, the processing system may determine whether the target operating frequency (i.e., determined by the target operating frequency determination module 451) exceeds the allowable operating frequency. If the target operating frequency exceeds the allowable operating frequency, then the operating frequency comparison/determination module 453 may determine an allowable operating frequency that stays within budget and is lower than the target operating frequency. In contrast, if the target operating frequency does not exceed the allowable operating frequency, then the operating frequency comparison/determination module 453 may determine the allowable operating frequency equals the target operating frequency.

In a non-limiting example, means for implementing the machine-readable instructions 430 of the operating frequency comparison/determination module 453 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The allowable operating frequency transmitting module 454 may be configured to transmit an indication of the allowable operating frequency for the processing system to the moving device control system. For example, the processing system may transmit the allowable operating frequency (i.e., determined by the operating frequency comparison/determination module 453) to the control system. In some embodiments, the transmitted indication of the allowable operating frequency may be configured to direct the moving device control system to lower a target movement speed of the moving device. Alternatively, or additionally, the transmitted indication of the allowable operating frequency includes a maximum movement speed limit for the moving device. In some embodiments, the allowable operating frequency may be transmitted in the form of a maximum allowable movement speed of the moving device, which may be determined from a translation of the actual operating frequency. For example, the maximum allowable movement speed may be determined (i.e., calculated) according to inputs, such as the determined actual processing system operating frequency. For example, the maximum allowable movement speed ($V_{Max}$) may be determined using the following formula:

$$V_{Max} = f_1(T_{PL}) = f_2(OF_{PL}) \qquad (2).$$

In equation (2), $T_{PL}$ is a total processing latency, a first function ($f_1$) of which equals the maximum allowable movement speed ($V_{Max}$). Also, $OF_{PL}$ is an operating frequency at a current processing load, a second function ($f_2$) of which also equals the maximum allowable movement speed ($V_{Max}$). Alternatively, various formulas may be used to determine the maximum allowable movement speed ($V_{Max}$).

In a non-limiting example, means for implementing the machine-readable instructions 430 of the allowable operating frequency transmitting module 454 may include the transceiver 159, a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The operating frequency changing module 455 may be configured to change an operating frequency of the processing system to the target operating frequency in response to determining that the target operating frequency does not exceed the allowable operating frequency. In addition, the operating frequency changing module 455 may be configured to change a current operating frequency of the processing system to a value below that of the target operating frequency in response to determining that the target operating frequency exceeds the allowable operating frequency. Alternatively, the processing system may avoid using the operating frequency changing module 455 in circumstances in which no change in the operating frequency is needed.

In a non-limiting example, means for implementing the machine-readable instructions 430 of the operating frequency changing module 455 may include a processor (e.g., 210, 212, 214, 216, 218, 252, 260, 141, 151) of a processing device (e.g., 140, 150) that may use the memory (e.g., 143, 153, 220, 258), external resources 420, and/or one or more other components of the processing system 150.

The control system 140 may include one or more processors configured to execute computer program modules similar to those in the machine-readable instructions 435 of the processing system 150 described above. Similarly, a given processing system 150 may include one or more processors configured to execute computer program modules similar to those in the machine-readable instructions 430 of the control system 140 described above.

The processor(s) 141, 151 may be configured to execute modules 441, 442, 443, 444, 445, 450, 451.452, 453, 454, and/or 455, and/or other modules. Processor(s) 141, 151 may be configured to execute modules 441, 442, 443, 444, 445, 450, 451, 452, 453, 454, and/or 455, and/or other modules by software; hardware; firmware; some combination of software, hardware, and/or firmware; and/or other mechanisms for configuring processing capabilities on processor(s) 141, 151. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 441, 442, 443, 444, 445, 450, 451, 452, 453, 454, and/or 455 described herein is for illustrative purposes, and is not intended to be limiting, as any of modules 441, 442, 443, 444, 445, 450.451, 452, 453, 454, and/or 455 may provide more or less functionality than is described. For example, one or more of modules 441, 442, 443, 444, 445, 450, 451, 452, 453, 454, and/or 455 may be eliminated, and some or all of its functionality may be provided by other ones of modules 441, 442, 443, 444, 445, 450, 451, 452, 453, 454, and/or 455. As another example, processor(s) 141, 151 may be configured to execute one or more additional modules that may perform some or all of the functionality attributed below to one of modules 441, 442, 443, 444, 445, 450, 451, 452, 453, 454, and/or 455.

Figure 4B:
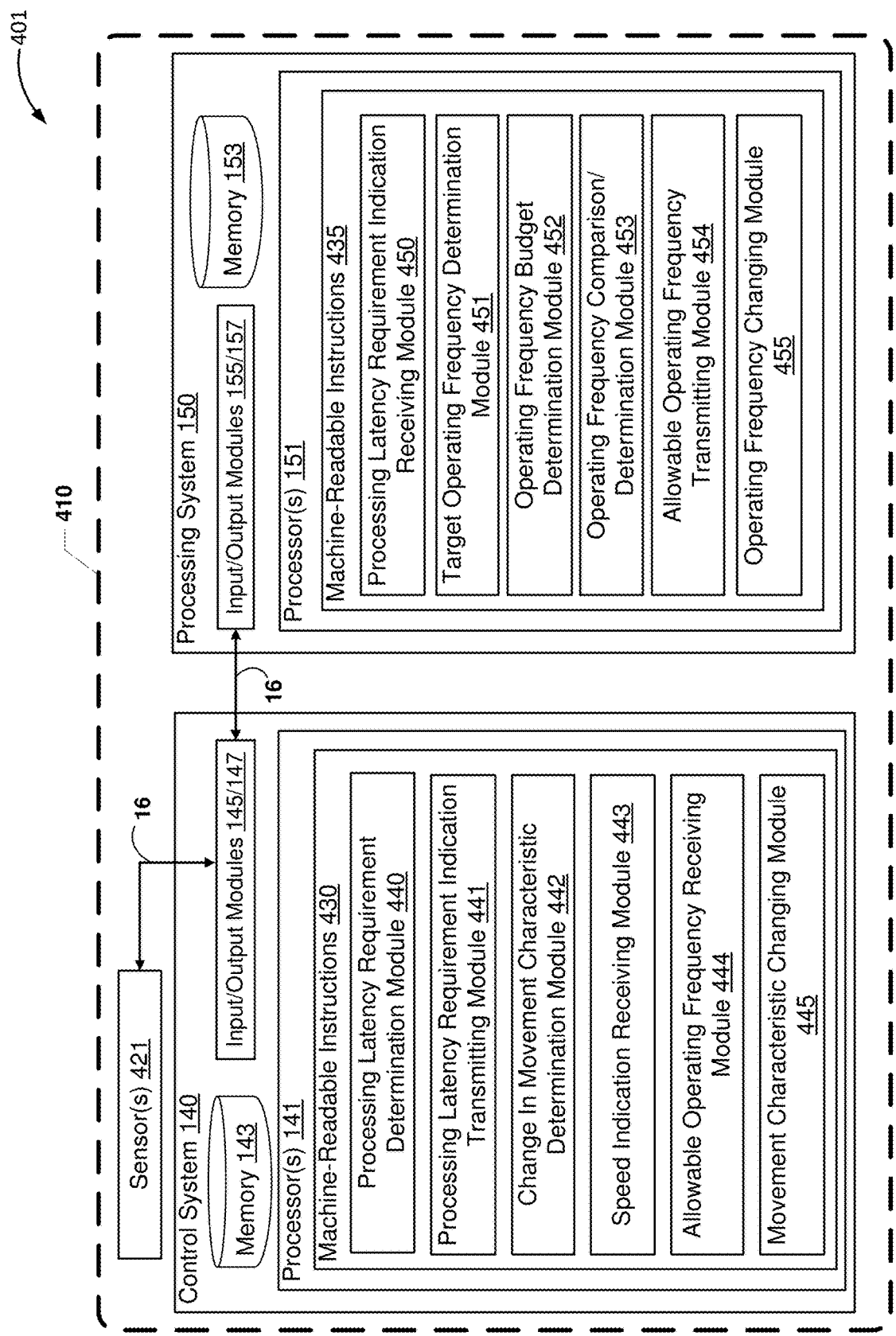

FIG. 4B is a component block diagram illustrating a moving device system 401. With reference to FIGS. 1A-4B, the moving device system 400 may be configured with a control system 140 that interacts with a processing system 150 in accordance with various embodiments. Each of the control system 140 and the processing system 150 may include a plurality of hardware, software, and/or firmware components operating together to provide the functionality attributed herein to the control system 140 and the processing system 150 of the moving device (e.g., 110*a*, 110*b*, 110*c*, 110*d*, 110*e*, 110*f*, 110*g*, 110*h*, 110*i*, 110*j*).

Like the moving device system 400, described with reference to FIG. 4A, the moving device system 401 may include the control system 140 and the processing system 150, both located within the moving device 410 (e.g., 110*a*, 110*b*, 110*c*, 110*d*, 110*e*, 110*f*). Thus, the control system 140 and the processing system 150 may communicate directly (i.e., without transceivers), such as through the input/output modules 145/147, 155/157 via the wired communication link 16. For example, the control system 140 may be an ADAS vehicle speed controller and the processing system 150 may be an SOC operating frequency controller. The control system 140 may additionally include or be coupled to an ADAS computer and software system. In addition, the control system 140 may receive inputs from one or more sensor(s) 421 also located in or on the moving device 410.

Figure 4C:
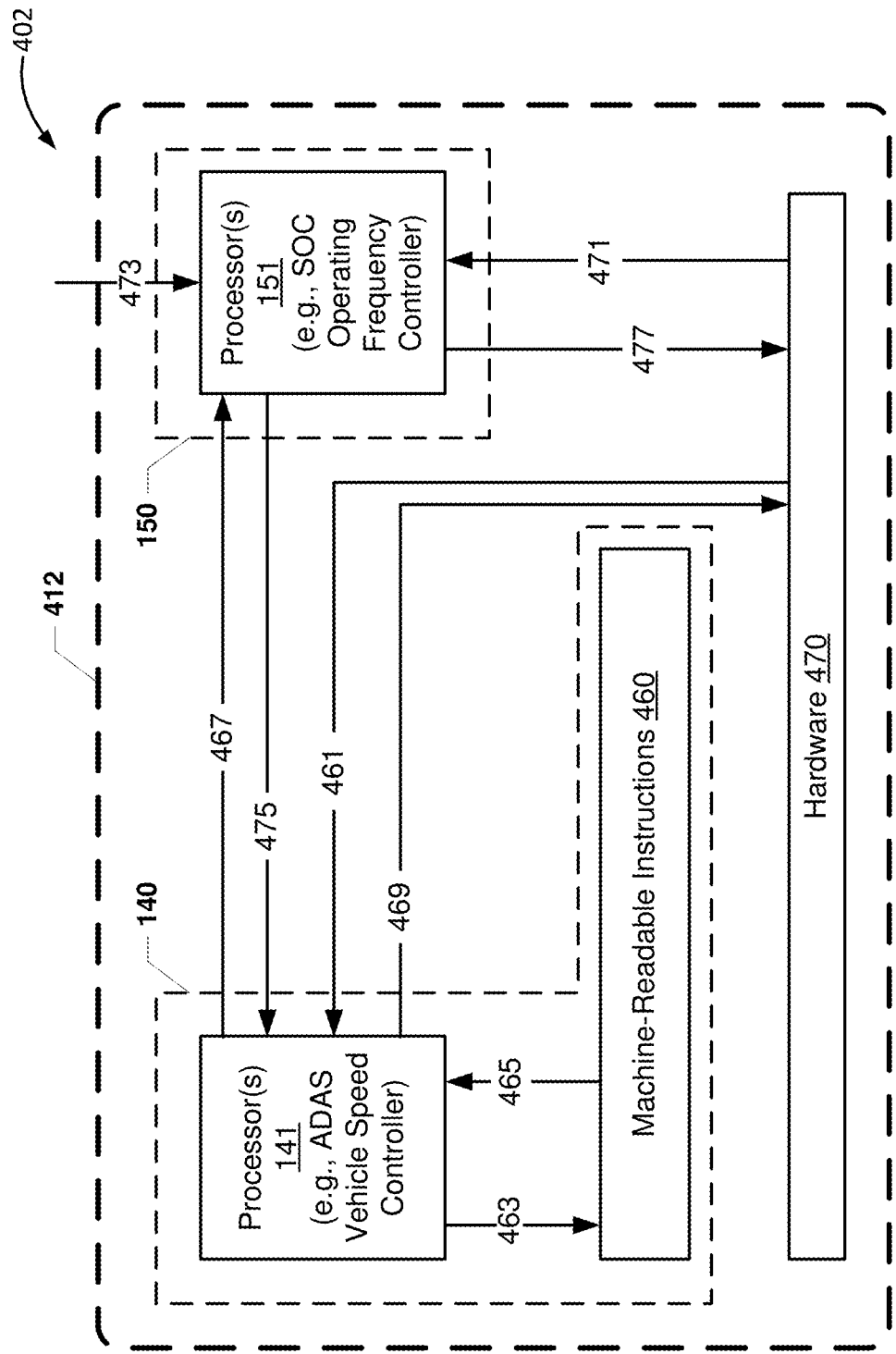

FIG. 4C is a communication flow diagram for components of a moving device 412 included in a moving device system 402. As an illustrative example, the moving device 412 is described with respect to FIG. 4C as a self-driving vehicle (e.g., 110a, 110b, 110c, 110d. 110e). However, it should be understood that the moving device 402 may be any type of moving device), in accordance with various embodiments.

With reference to FIGS. 1A-4C, the moving device system 402 may include the control system 140 that interacts with the processing system 150 and other hardware 470, all disposed within the moving device 412 (e.g., 110a, 110b, 110c, 110d, 110e, 110f), in accordance with various embodiments. Each of the control system 140, the processing system 150, and the hardware 470 may include a plurality of hardware, software, and/or firmware components operating together to provide the functionality attributed herein to the control system 140 and the processing system 150 of the moving device system 402. The machine-readable instructions 460 may include self-driving algorithms that make determinations for one or more of various types of functionality (e.g., perception of vision, localization and mapping, driving path planning, vehicle control and/or vehicle component actuation). The hardware 470 may include a processor, SOC, application-specific integrated circuits (ASIC), or other computing device, as well as one or more sensors (e.g., 421).

In various embodiments, the one or more sensors in the hardware 470 may transmit sensor data 461 to the processor(s) 141 (e.g., ADAS Vehicle Speed Controller) of the control system 140, which may in-turn provide or make available raw or processed sensor data 463 to the machine-readable instructions 460. For example, the sensor data 461 may reflect a current speed of the moving device (i.e., an actual driving speed), such as measurements obtained from a wheel speed sensor.

Based on the raw or processed sensor data 463, the machine-readable instructions 460 operating the self-driving algorithm may determine movement characteristic data 465, such as a target speed of the moving device, the speed of one or more other objects near the moving device, or other movement characteristic associated with a processing latency requirement of the processing system 150. A determined current speed of the moving device may reflect more than one speed of the moving device relative to each of the one or more other objects. Thus, based on the raw or processed sensor data 463 the self-driving algorithm may determine the moving device needs to accelerate significantly. The determined movement characteristic data 465 may reflect that increase in acceleration, which in-turn is associated with processing latency requirements for the processing system 150.

In response to receiving and further processing the raw or processed sensor data 463, the machine-readable instructions 460 may provide the processor(s) 141 with the determined movement characteristic data 465, which the processor(s) 141 may in-turn convey as processing latency requirement data 467 to the processor(s) 151 (e.g., SOC Operating Frequency Controller) of the processing system 150. The processing latency requirement data 467 may reflect a processing latency needed by the moving device to achieve a determined target speed identified in the determined movement characteristic data 465. In some embodiments, the processing latency requirement data 467 may include a processing latency vote submitted by the control system 140 to the processing system 150. The processing latency vote may be a consideration weighed by the processing system 150 in determining whether the needed processing latency may be safely achieved.

In some embodiments, the one or more sensors in the hardware 470 may transmit additional sensor data 471 to the processor(s) 151 (e.g., SOC Operating Frequency Controller) of the processing system 150. For example, the additional sensor data 471 may reflect information from conventional temperature sensors and/or power/load monitoring devices of the moving device. The processor(s) 151 may additionally be programmed with or configured to determine an allowable operating frequency based on an operating frequency budget limiting operations of the processing system. The operating frequency budget may be based on at least one of a thermal, power, or load output limit 473 designated for the processor(s) 151. The thermal, power, or load output limit 473 may reflect limits set on the processor(s) 151, which limits may be taken into account by the processor(s) 151 when weighing whether a needed processing latency may be safely achieved.

In some embodiments, the processor(s) 151 of the processing system 150 may weigh various inputs in order to determine an allowable operating frequency. For example, the processor(s) 151 may weigh additional sensor data 471, the thermal, power, or load output limit 473, and the processing latency requirement data 467 in coordination with the processor(s) of the control system 140 to optimize energy efficiencies and reduce unnecessary heat generation. In addition, the processor(s) 151 may transmit a driving speed max limiting indication 475 to the processor(s) 141 of the control system 140, as well as communicate its actual (or adjusted) operating frequency 477 to the hardware 470. The driving speed max limiting indication 475 may reflect a processing latency of the processing system, which may limit the speed at which the moving device may safely operate.

In some embodiments, the processor(s) 141 of the control system 140 may considering the received driving speed max limiting indication 475 and limit the speed of the moving device, if necessary, according to the actual (or adjusted) processing latency of the processor(s) 151 of the processing system 150. Thus, the processor(s) 141 of the control system 140 may communicate a movement action 469 to the hardware 470. For example, the movement action 469 may reflect an acceleration, braking, and/or steering action for the moving device.

Figure 5:
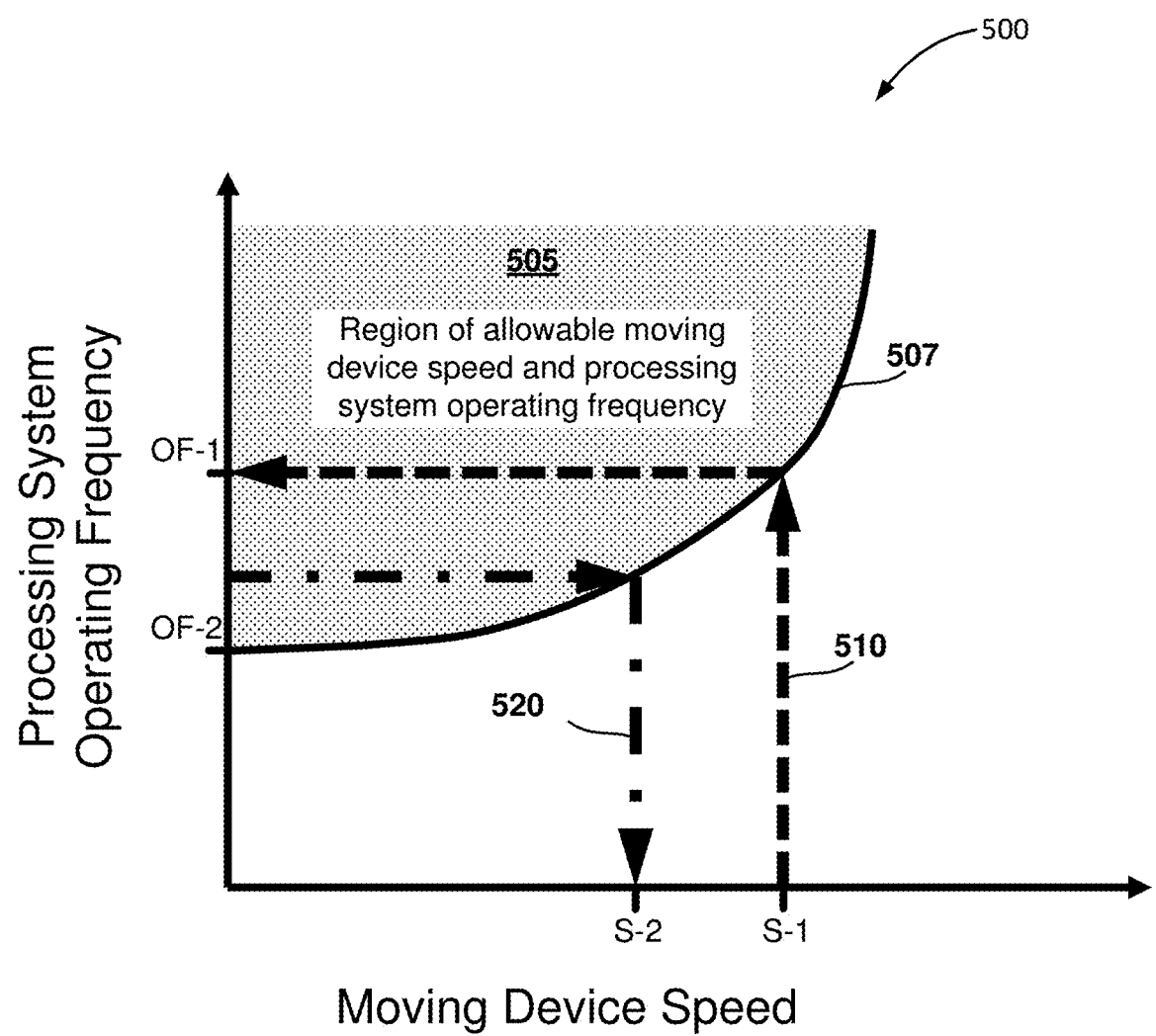
FIG. 5 is a graphical representation of a control link between moving device speed and processing system operating frequency in accordance with various embodiments.

FIG. 5 is a graphical representation of a control link between a moving device speed and a processing system operating frequency. With reference to FIGS. 1A-5, the graph 500 demonstrates how a moving device speed translates to a processing system operating frequency and vice versa. The horizontal axis represents changes in the moving device speed, while the vertical axis represents changes in the processing system operating frequency. The shaded region 505 represents a region of allowable moving device speed and processing system operating frequency. The curve 507 represents the conversion for moving device speed to operating frequency and vice versa. As illustrated in dashed line 510, a control system (e.g., 140) may transmit a processing latency requirement indication, in the form of a target moving device speed S-1, to an operating frequency controller (e.g., processing system 150) of the moving device, which corresponds to a first translation 510 that equals a first operating frequency OF-1. As illustrated in dashed line 520, the operating frequency controller may respond by transmitting an indication of the allowable operating frequency OF-2 for the processing system to the moving device control system, which corresponds to a second translation 520 that equals a lower maximum moving device speed S-2.

When a target moving device speed is transmitted by a control system to a processing system, the processing system may take into account several factors in determining what operating frequency is appropriate under the circumstances. For example, the processing system may consider a stopping distance needed by the moving device due to the processing time it takes to make the inference or achieve the perception that stopping is needed at a given processing latency; the reaction time needed for actuators and other devices to engage the braking systems; and/or braking distances needed at a particular speed.

Figure 6:
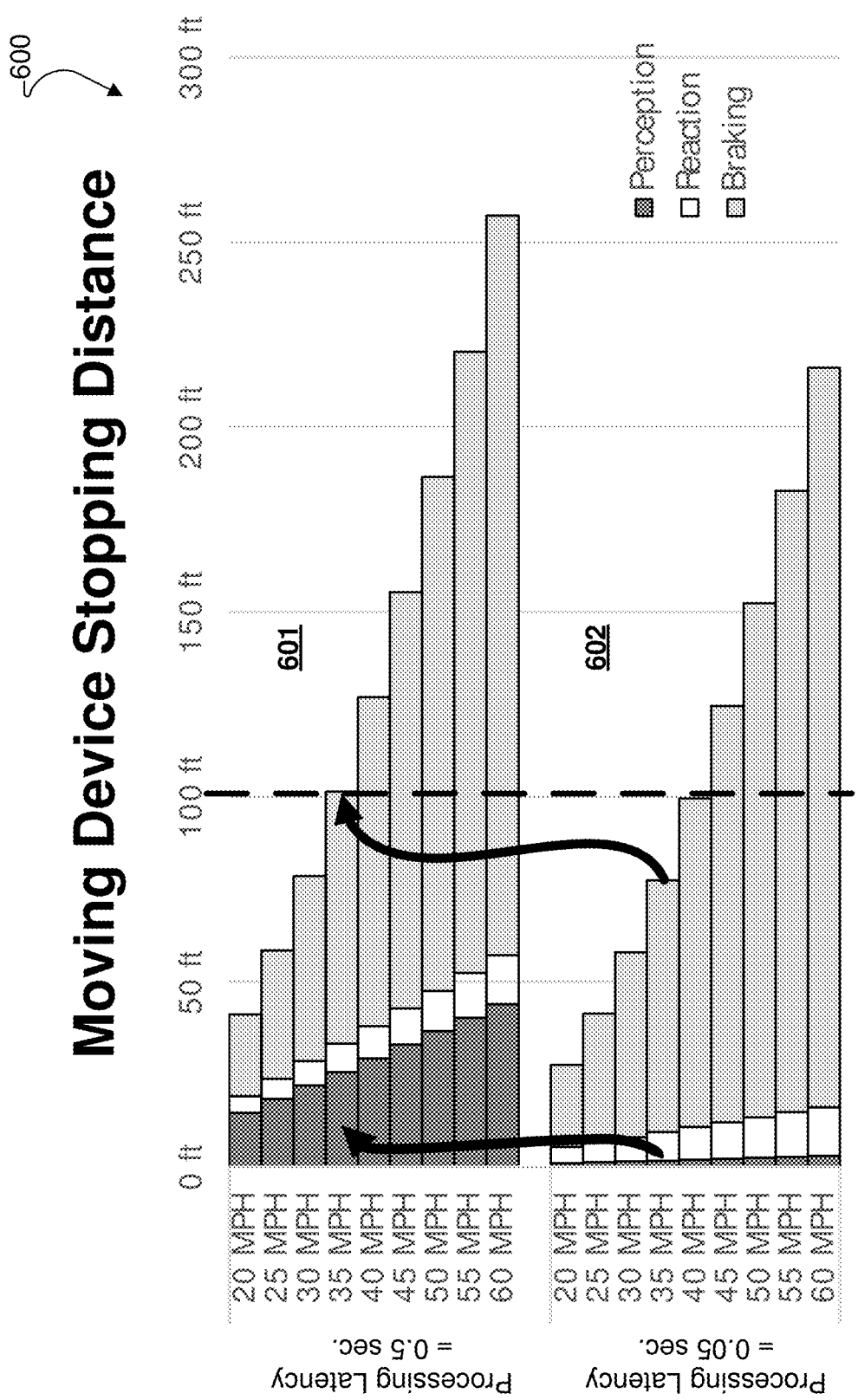
FIG. 6 is a set of two bar graphs corresponding to different perception latencies and illustrating an operational link between moving device speed and vehicle stopping distance that considers perception, reaction, and braking time in accordance with various embodiments.

FIG. 6 is a set of two bar graphs, each corresponding to different perception latencies, representing an operational link between moving device speed and vehicle stopping distance that considers perception, reaction, and braking time. With reference to FIGS. 1A-6, the first graph 601 illustrates an example of moving device stopping distances based on moving device speeds using a processing latency of 0.5 seconds. The second graph 602 illustrates an example of moving device stopping distances based on moving device speeds using a processing latency of 0.05 seconds. As shown, the furthest left and darkest gray shaded areas represent stopping distances corresponding to the processing time it takes to make the inference or achieve the perception that stopping is needed at the designated processing latency (i.e., perception distance). The perception distance reflects how far the moving device will travel from the time a control system recognizes a hazard by completing a perception algorithm (i.e., an artificial intelligence inference). The middle and non-shaded areas represent stopping distances corresponding to the reaction time needed for actuators and other devices to engage the braking systems (i.e., reaction distance). The reaction distance reflects how far the moving device travels after the perception time is complete until the brakes are physically actuated. The furthest right and light gray shaded areas represent stopping distances needed by the braking systems to stop the moving device (i.e., braking distance). The braking distance reflects how far the moving device travels while the brakes are engaged until the moving device stops. This sum of all three distances, namely the perception, reaction, and braking distances, represents a total stopping distance.

In accordance with various embodiments, the following formulas may be used to calculate the total stopping distance of a moving device.

$$d_{perception} + d_{reaction} + d_{braking} = d_{stopping} \quad (3)$$

$$d_{perception} = t_{perception} \times v = (l_{PS\_perception}/f_{PS\_perception}) \times v \quad (4)$$

$$d_{reaction} = t_{reaction} \times v \quad (5)$$

$$d_{braking} = v^2/(2ug) \quad (6).$$

In equations (3)-(6), d represents distance, t represents time, v represents moving device velocity, $l_{PS\_perception}$ represents an amount of time used by processing system to perceive a need to stop, $f_{PS\_perception}$ represents the operating frequency of the processing system, u represents coefficient of friction (e.g., tires and road surface), and g represents gravity. As shown by equation (3), perception distance ($d_{perception}$) plus reaction distance ($d_{reaction}$) plus braking distance ($d_{braking}$) equals stopping distance ($d_{stopping}$). In equation (4), the perception distance ($d_{perception}$) may be calculated as perception time ($t_{perception}$) multiplied by velocity (v), which translates to the processing load for perception ($l_{PS\_perception}$), divided by the operating frequency at which perception is performed ($f_{PS\_perception}$), multiplied by velocity (v). In the equation (5), the reaction distance ($d_{reaction}$) equals the reaction time ($t_{reaction}$) multiplied by velocity (v). In equation (6), the braking distance ($d_{braking}$) equals velocity squared ($v^2$) divided by two times the coefficient of friction (u) times gravity (g).

As shown by the first and second graphs 601, 602, while maintaining a steady velocity of 35 MPH, the moving device may shorten stopping distance by decreasing the processing latency, which is driven mainly by a reduction in the perception time ($t_{perception}$). Thus, the processing system's processing latency and operating frequency may be accurately adjusted based on moving device speed, or a target speed reflected in a processing latency vote by the control system (e.g., 140). Also, a processing latency of the processing system may be relaxed (e.g., from 0.05 sec. to 0.5 sec.), which conserves energy and operates more efficiently, if the processing system may achieve the minimum stopping distance (e.g., 100 feet) for a given moving device speed (e.g., 35 MPH) at a higher processing latency. Also, the first and second graphs 601, 602 demonstrate how for a given processing latency (e.g., 0.05 sec or 0.5 sec.) some moving device speeds may be dangerous (i.e., risk accidents). Thus, a moving device traveling at speeds above 40 MPH, while the processing system operates at a 0.05 sec. processing latency, needs to slow down below 40 MPH. Similarly, a moving device traveling at speeds above 35 MPH, while the processing system operates at a 0.5 sec. processing latency, needs to slow down below 35 MPH.

Figure 7:
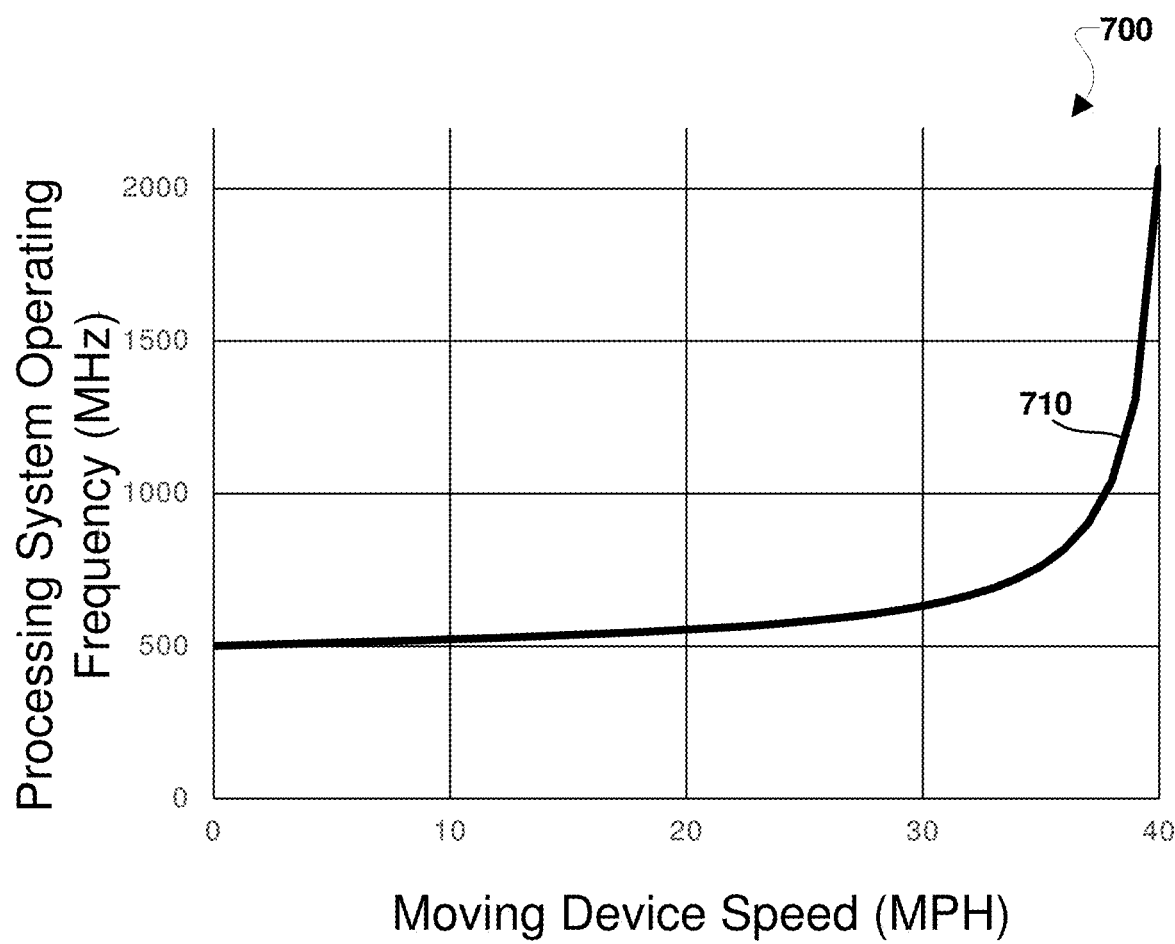
FIG. 7 is a graphical representation of a conversion between moving device speed and operating frequency in accordance with various embodiments.

FIG. 7 is a graphical representation of a conversion between moving device speed and operating frequency. With reference to FIGS. 1A-7, the graph 700 demonstrates how a moving device speed translates to a processing system operating frequency and vice versa. The horizontal axis represents the moving device speed in miles per hour (MPH), while the vertical axis represents the processing system operating frequency in megahertz (MHz). The curve 710 is calculated using the following formula $$f_{PS} = \frac{v \times l_{PS\_perception}}{d_{stopping} - (t_{reaction} \cdot v) - v^2/2ug} + f_{PS\_baseload}. \quad (7)$$

In equation (7), $f_{PS}$ represents a calculated operating frequency needed to support a velocity v of the moving device, $l_{PS\_perception}$ represents an amount of time used by processing system to perceive a need to stop, $d_{stopping}$ is the total distance needed for the moving device to stop from the velocity v, $t_{reaction}$ is the time it takes the moving device equipment to activate the braking systems, and $f_{PS\_baseload}$ is a baseline operating frequency the processing system requires to operate (e.g., 500 MHz in FIG. 7). The curve 710 represents the conversion for moving device speed to operating frequency and vice versa. In addition, the curve 710 is calculated using an assumption that the stopping distance ($d_{stopping}$) equals 100 feet and reaction time ($t_{reaction}$) equals 0.15 seconds. As shown, the operating frequency must exponentially escalate when the moving device speed goes above 30 mph in order to stop within 100 and maintain a 0.15 second reaction time.

Figure 8:
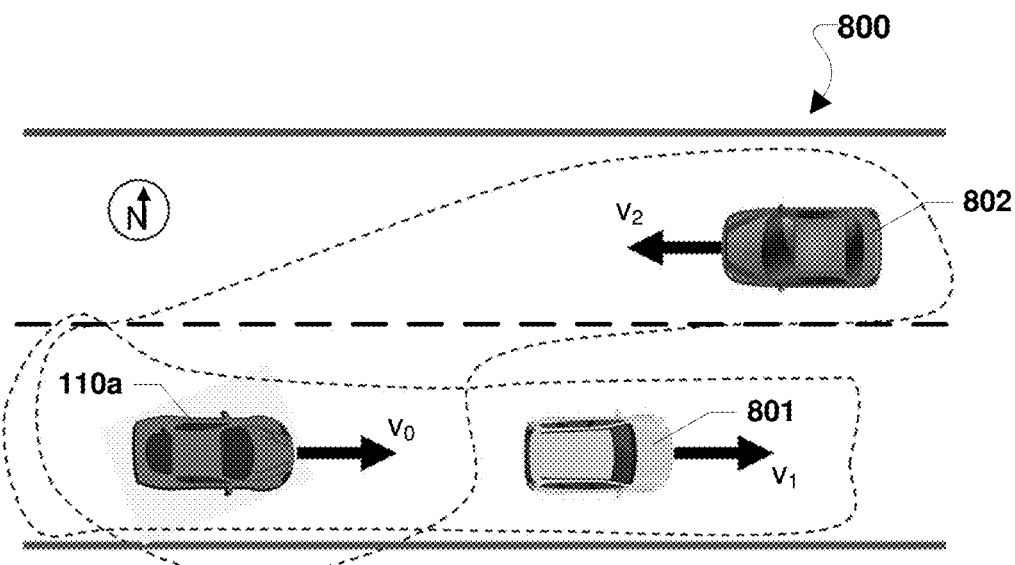
FIG. 8 is a schematic diagram illustrating an example moving device system operating in the vicinity of the other moving objects in accordance with various embodiments.

FIG. 8 is a schematic diagram illustrating an example moving device in the form of a vehicle 110a operating in the vicinity of the other moving objects. With reference to FIGS. 1A-8, the environment 800 include the vehicle 110a traveling eastbound behind a first vehicle 801, which is also traveling eastbound. A difference between a current velocity $v_0$ of the vehicle 110a and a first velocity $v_1$ of the first vehicle 801 reflects the first relative velocity $v_{R1}$ of the vehicle 110a, relative to the first vehicle 801. In contrast, a second vehicle 802 is traveling westbound, opposite that of the vehicle 110a. A difference between a current velocity $v_0$ of the vehicle 110a and a second velocity $v_2$ of the second vehicle 802 reflects the second relative velocity $V_{R2}$ of the moving device 110a, relative to the second vehicle 802.

Figure 9:
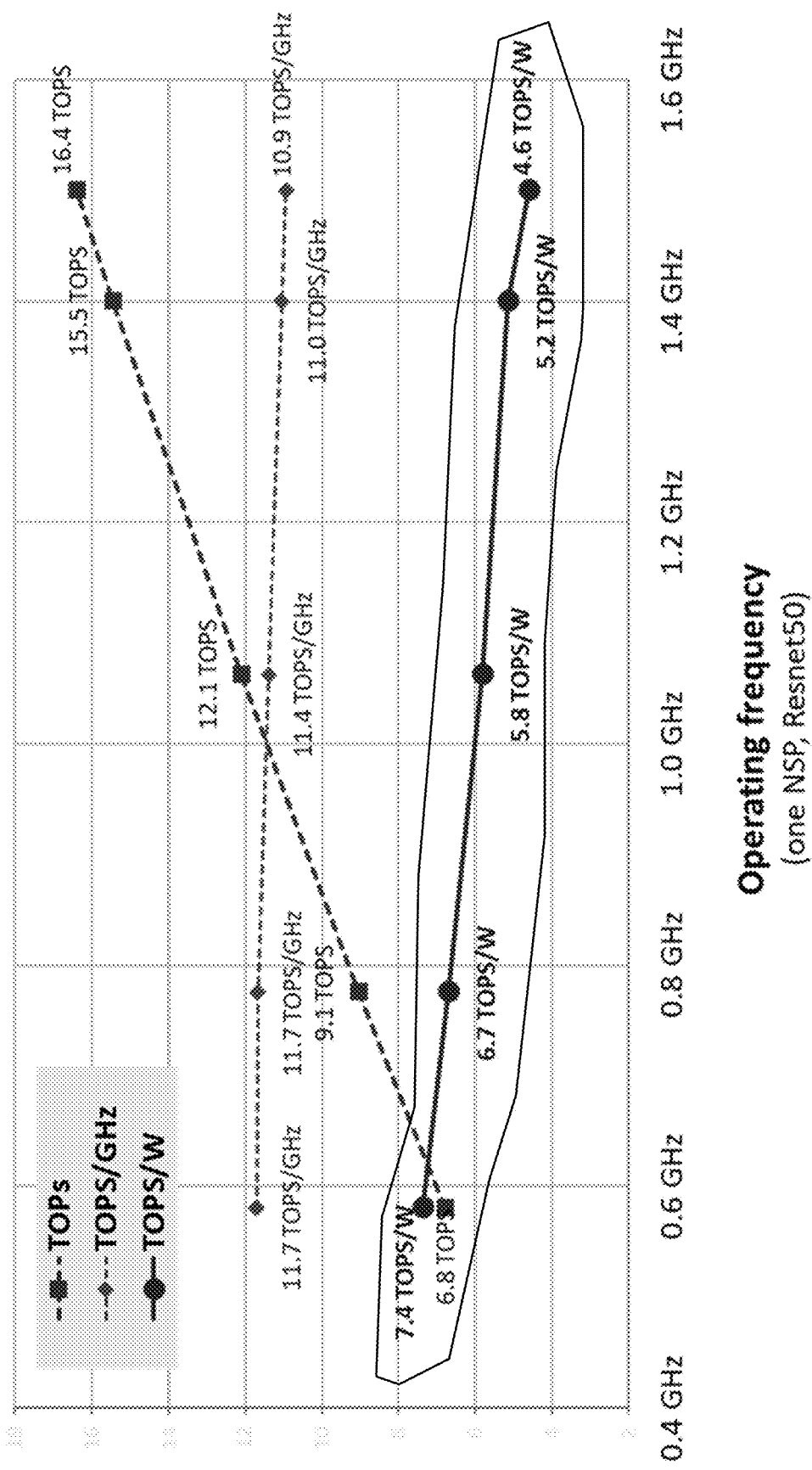
FIG. 9 is a graphical representation of energy efficiency comparisons for a system-on-a-chip in accordance with various embodiments.

FIG. 9 is a graphical representation of energy efficiency comparisons for a system-on-a-chip. With reference to FIGS. 1A-9, Tera Operations Per Second (TOPS) refers to the number of operations (load executed) performed during a unit time (e.g., seconds). FIG. 9 illustrates how TOPS values, which are shown with square data points, may increase with increases in operating frequency. In contrast, the value of TOPS per gigahertz (GHz), which are shown with diamond-shaped data points, may reduce gradually with increases in operating frequency. Similarly, the value of TOPS per watt (TOPS/W), which is shown with circular data points, reduce gradually with increases in operating frequency.

Figure 10A:
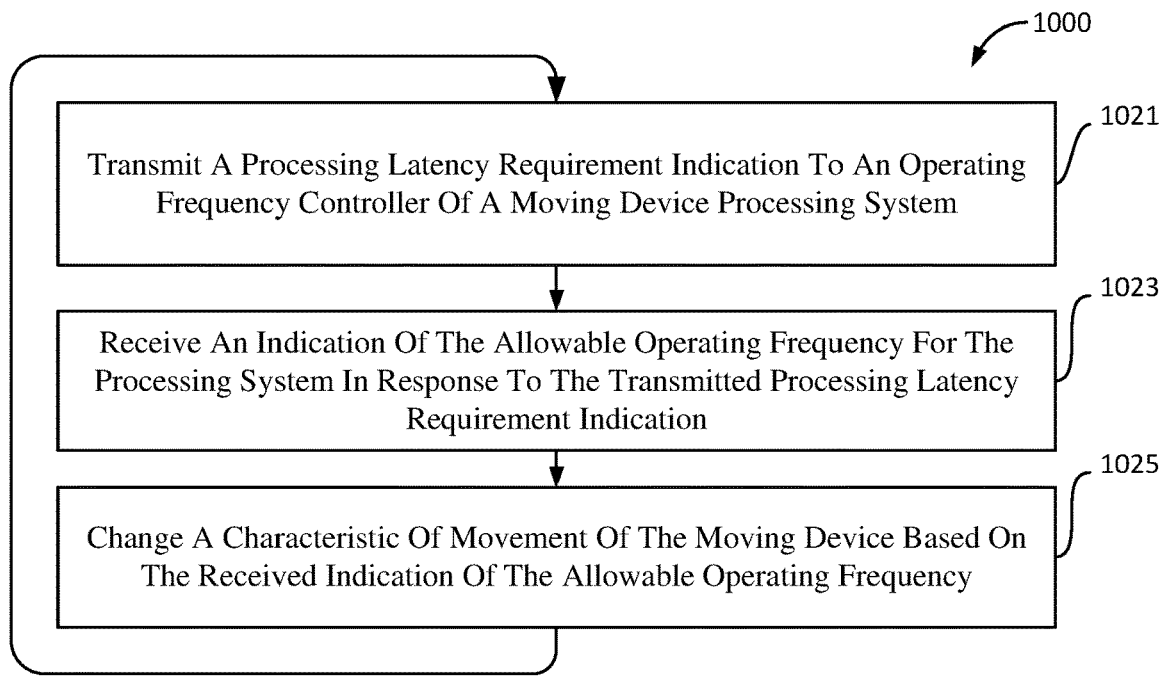
FIGS. 10A-10C are process flow diagrams of a method for a moving device control system to interact with a processing system of a moving device according to various embodiments.
Figure 10B:
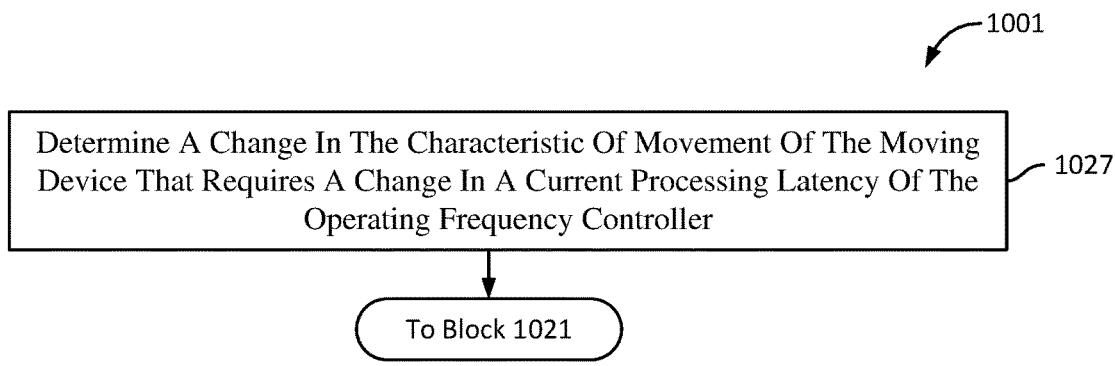
Figure 10C:
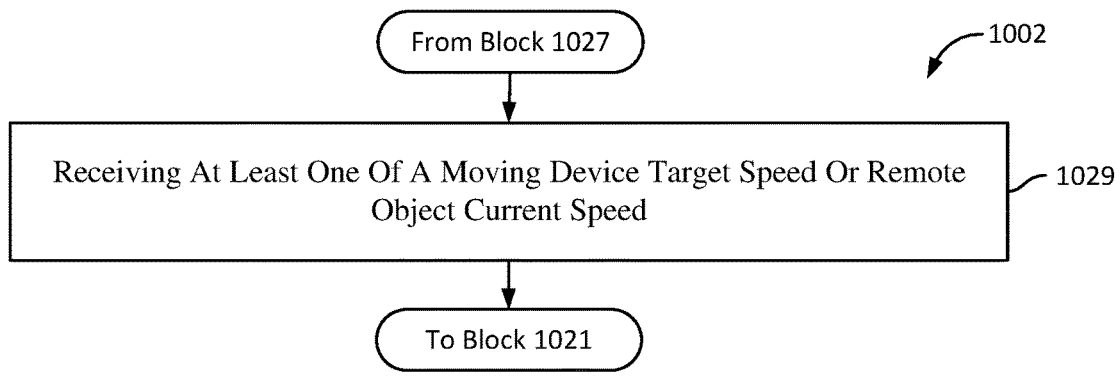

FIGS. 10A-10C are process flow diagrams illustrating operations of a methods 1000, 1001, 1002 performed by a moving device control system interacting with a processing system, in accordance with various embodiments. In some embodiments, methods 1000, 1001, 1002 may be accomplished with one or more additional operations not described, and/or without one or more of the operations discussed. With reference to FIGS. 1A-10A, the operations of the method 1000 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a control system (e.g., 140). The one or more processors may include one or more devices configured through hardware, firmware, and/or software to be specifically designed for execution of one or more of the operations of the method 1000. For example, the operations of the method 1000 may be performed by a processor (e.g., 210, 212, 214, 216, 218, 252, 260, 141, 151) of the control system.

Referring to FIG. 10A, in block 1021 of the method 1000, the processor of control system may perform operations including transmitting a processing latency requirement indication to an operating frequency controller of a moving device processing system. In block 1021, the processor of the control system may use the processing latency requirement indication transmitting module (e.g., 441). For example, the transmitted processing latency requirement indication may correlate to a target speed of the moving device. In addition, or alternatively, the transmitted processing latency requirement indication may include a latency requirement vote requesting a minimum latency from the processing system. In some embodiments, means for performing the operations of block 1021 may include a transceiver (e.g., 149), a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

In block 1023, the processor of control system may perform operations including receiving an indication of the allowable operating frequency for the processing system in response to transmitting the processing latency requirement indication. In block 1023, the processor of the control system may use the allowable operating frequency receiving module (e.g., 444). In block 1023, the received indication of the allowable operating frequency may be configured to limit a maximum speed for the moving device. For example, the operating frequency of the processing system may be limited or throttled in some way which translates to a maximum speed that the moving device may operate safely. In some embodiments, means for performing the operations of block 1023 may include a transceiver (e.g., 149), a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

In block 1025, the processor of control system may perform operations including changing a characteristic of movement of the moving device based on the received indication of the allowable operating frequency. In block 1025, the processor of the control system may use the movement characteristic changing module (e.g., 445). In block 1025, changing the characteristic of movement of the moving device may include changing a speed of the moving device to a target speed associated with the received indication of the allowable operating frequency. Alternatively, changing the characteristic of movement of the moving device may include changing the speed of the moving device to something lower than the target speed because of the limits placed on the operating frequency of the processing system. In some embodiments, means for performing the operations of block 1025 may include a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

In some embodiments, the processor may repeat any or all of the operations in blocks 1021, 1023, and 1025 repeatedly or continuously to perform interactive controls of moving device speed and processing system operating frequency.

FIG. 10B illustrates method 1001 that may be performed with or as an enhancement to the method 1000.

Referring to FIG. 10B, in block 1027, the processor of control system may perform operations including determining a change in the characteristic of movement of the moving device that requires a change in a current processing latency of the operating frequency controller. In block 1027, the processor of the control system may use the change in movement characteristic determination module (e.g., 444). Thus, the transmitted processing latency requirement indication, in block 1021, may reflect the determined change in the characteristic of movement of the moving device. Means for performing the operations of block 1027 may include a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

The processor may then perform the operations of block 1021 of the method 1000 (FIG. 10A) as described.

FIG. 10C illustrates method 1002 that may be performed with or as an enhancement to the methods 1000 and 1001.

Referring to FIG. 10C, in block 1029 following the operation in block 1027 of the method 1001, the processor of control system may perform operations including receiving at least one of a moving device target speed or remote object current speed. In block 1029, the processor of the control system may use the speed indication receiving module (e.g., 443). Thus, the determined change in the characteristic of movement of the moving device control system, in block 1029, may be based on the received at least one of the moving device control system target speed or the remote object current speed. Means for performing the operations of block 1029 may include a transceiver (e.g., 149), a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

The processor may then perform the operations of block 1021 of the method 1000 (FIG. 10A) as described.

FIGS. 11A-11I are process flow diagrams illustrating operations of a methods 1100, 1101, 1102, 1103, 1104, 1105, 1106, 1107, 1108 performed by a moving device processing system interacting with a control system, in accordance with various embodiments. In some embodiments, methods 1100, 1101, 1102, 1103, 1104, 1105, 1106, 1107, 1108 may be accomplished with one or more additional operations not described, and/or without one or more of the operations discussed. With reference to FIGS. 1A-11A, the operations of the method 1100 may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a processing system (e.g., 150). The one or more processors may include one or more devices configured through hardware, firmware, and/or software to be specifically designed for execution of one or more of the operations of the method 110. For example, the operations of the method 1100 may be performed by a processor (e.g., 210, 212, 214, 216, 218, 252, 260, 141, 151) of the processing system.

Figure 11A:
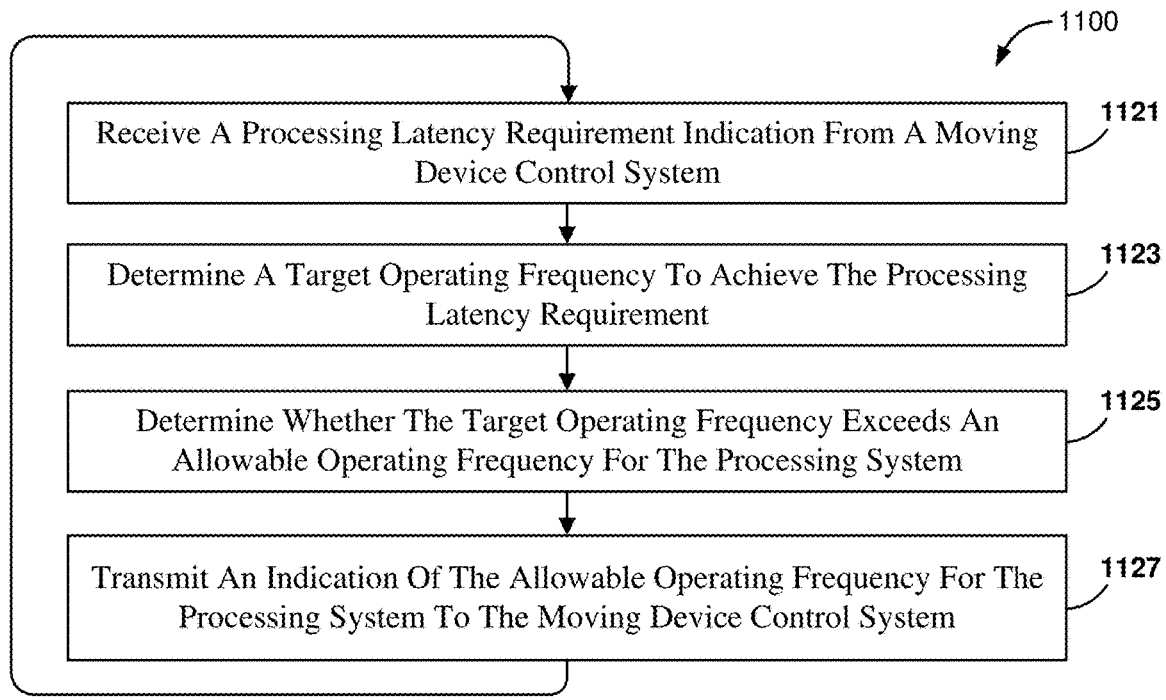
FIGS. 11A-11I are process flow diagrams of a method for a processing system to interact with a control system of a moving device according to various embodiments.

Referring to FIG. 11A, in block 1121, the processor of processing system may perform operations including receiving an indication of a processing latency requirement from a moving device control system. In block 1121, the processor of the processing system may use the processing latency requirement indication receiving module (e.g., 450). For example, the received indication of the processing latency requirement may correlate to a target speed of the moving device. In addition, or alternatively, the received indication of the processing latency requirement may include a latency requirement vote requesting a minimum latency from the processing system. In some embodiments, means for performing the operations of block 1121 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In block 1123, the processor of processing system may perform operations including determining a target operating frequency to achieve the processing latency requirement. In block 1123, the processor of the processing system may use the target operating frequency determination module (e.g., 451). For example, the determined target operating frequency may limit or throttle the operations of the processing system (e.g., 150), in some way which translates to a limit on the speed that the moving device may operate safely. In some embodiments, means for performing the operations of block 1123 may include a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In block 1125, the processor of processing system may perform operations including determining whether the target operating frequency exceeds an allowable operating frequency for the processing system. In block 1125, the processor of the processing system may use the operating frequency comparison/determination module (e.g., 453). In some embodiments, means for performing the operations of block 1125 may include a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In block 1127, the processor of processing system may perform operations including transmitting an indication of the allowable operating frequency for the processing system to the moving device control system. In block 1127, the processor of the processing system may use the allowable operating frequency transmitting module (e.g., 454). In some embodiments, the transmitted indication of the allowable operating frequency may be configured to direct the moving device control system to lower a target movement speed of the moving device. In some embodiments, the transmitted indication of the allowable operating frequency includes a maximum movement speed limit for the moving device. Means for performing the operations of block 1127 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In some embodiments, the processor may repeat any or all of the operations in blocks 1121, 1123, 1125, and 1127 repeatedly or continuously to perform interactive controls of moving device speed and processing system operating frequency.

Figure 11B:
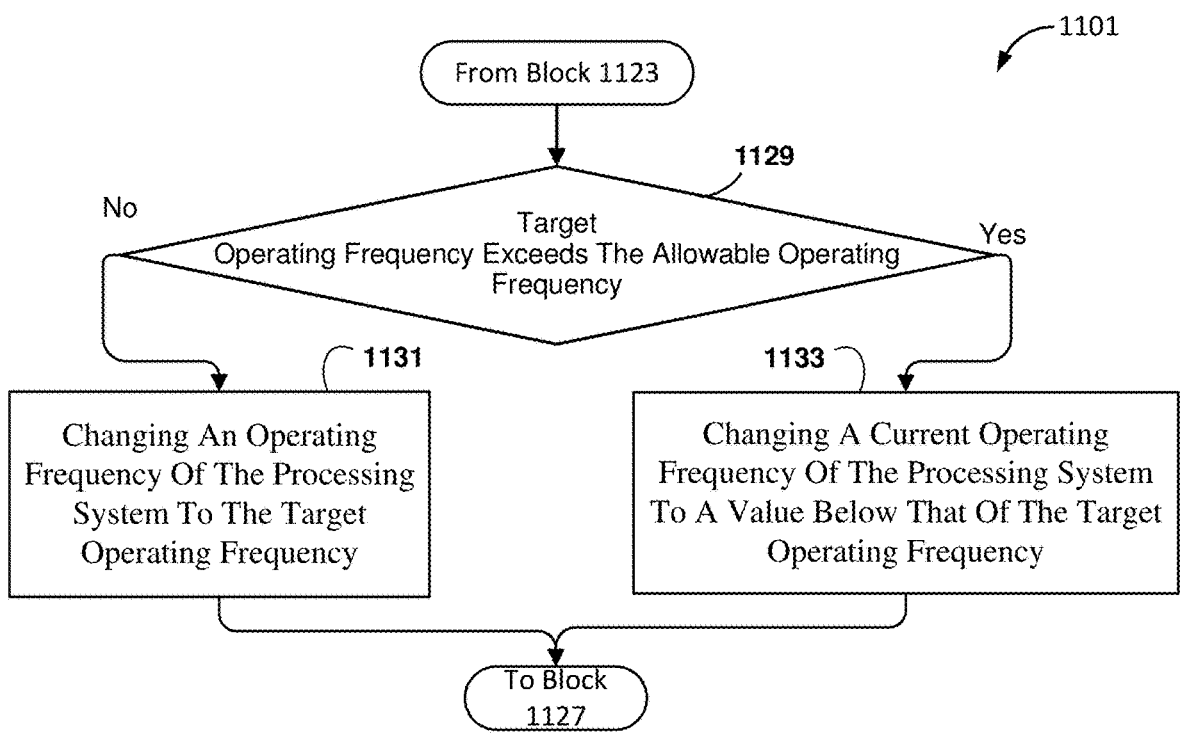

FIG. 11B illustrates method 1101 that may be performed with or as an enhancement to the method 1100.

Referring to FIG. 11B, following the operations in block 1123, in determination block 1129 the processor of the processing system may perform operations including determining whether the target operating frequency exceeds an allowable operating frequency for the processing system. In determination block 1129, the processor of the processing system may use the operating frequency comparison/determination module (e.g., 453).

In response to determining that the target operating frequency being equal to or not exceeding an allowable operating frequency for the processing system (i.e., determination block 1129="No"), the processor may change an operating frequency of the processing system to the target operating frequency in block 1131.

In response to determining that the target operating frequency exceeds an allowable operating frequency for the processing system (i.e., determination block 1129="Yes"), the processor may change a current operating frequency of the processing system to a value below that of the target operating frequency in block 1133. Means for performing the operations of determination block 1129 may include a processor (e.g., 210, 212, 214, 216, 218, 252, 260, 141, 151) of a control system (e.g., 140) that may use the memory (e.g., 143, 153, 220, 258), external resources 420, and/or one or more other components of the control system 140 and/or the processing system 150.

The processor may then perform the operations of block 1127 of the method 1100 (FIG. 11A) as described.

Figure 11C:
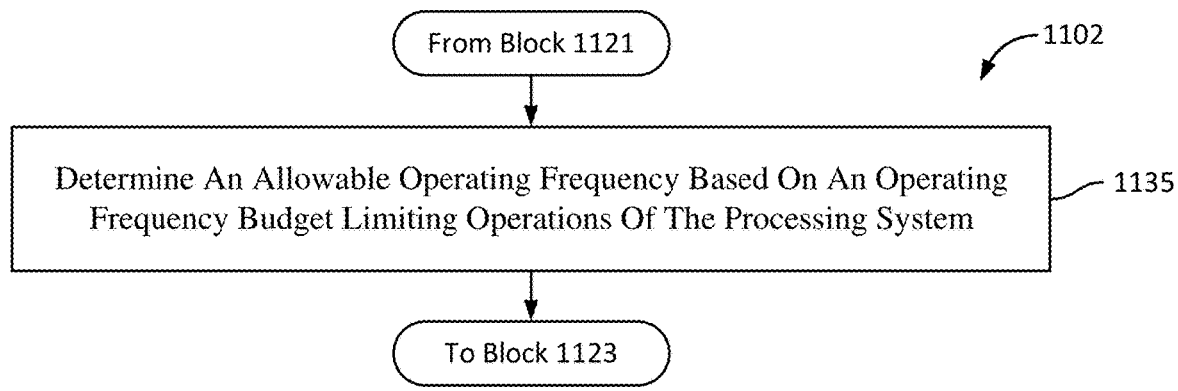

FIG. 11C illustrates method 1102 that may be performed with or as an enhancement to the method 1100.

Referring to FIG. 11C, following the operations in block 1121, in block 1135 the processor of the processing system may perform operations including determining the allowable operating frequency based on an operating frequency budget that may limit operations of the processing system. The operating frequency budget may reflect limits of the processing system, such as the thermal, power, and/or load output limits thereof.

In block 1135, the processor of the processing system may use the operating frequency budget determination module (e.g., 452). Thus, the determined allowable operating frequency for the processing system may be based on the operating frequency budget. Means for performing the operations of block 1135 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

Figure 11D:
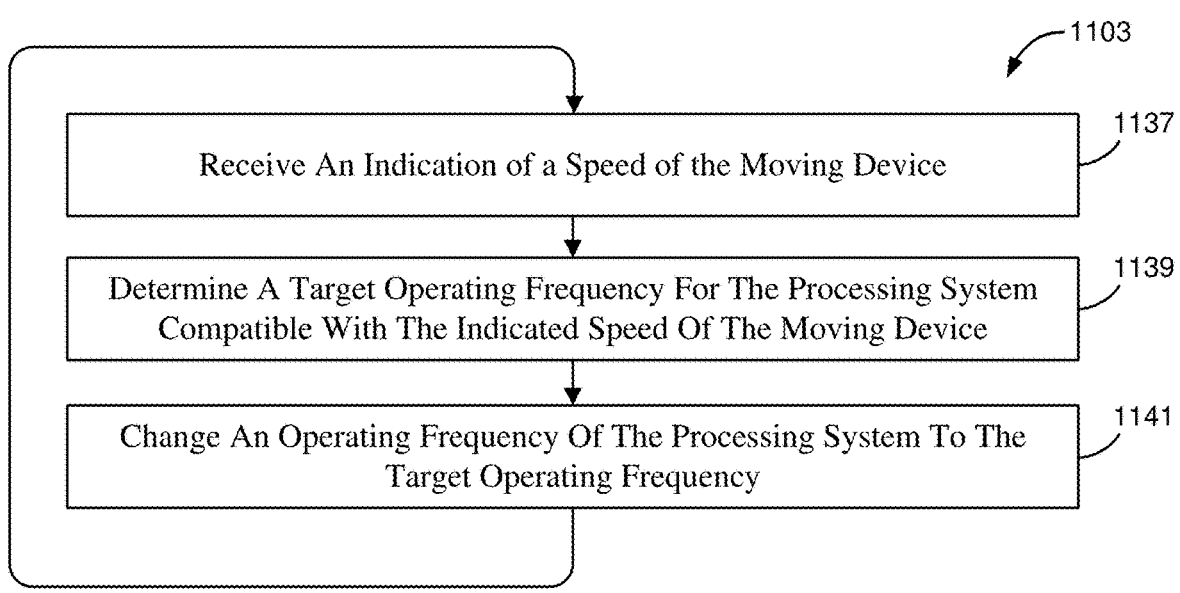

FIG. 11D illustrates method 1103 that may be performed as an alternative to or as an enhancement to the method 1100.

Referring to FIG. 11D, in block 1137, the processor of the processing system may perform operations including receiving an indication of a speed of a moving device. In block 1137, the processor of the processing system may use the processing latency requirement indication receiving module (e.g., 450). For example, the received indication of the processing latency requirement may correlate to a speed of the moving device. Additionally or alternatively, the received indication of the processing latency requirement may include a latency requirement vote requesting a minimum latency of the processing system needed to support the corresponding speed of the moving device. In some embodiments, means for performing the operations of block 1137 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In block 1139, the processor of the processing system may perform operations including determining a target operating frequency for the processing system compatible with the speed of the moving device received in block 1137. In block 1139, the processor of the processing system may use the target operating frequency determination module (e.g., 451). For example, the determined target operating frequency may limit or throttle the operations of the processing system (e.g., 150) in a manner that translates to a limit on the speed that the moving device may operate safely. In some embodiments, means for performing the operations of block 1139 may include a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In block 1141, the processor may change an operating frequency of the processing system to the target operating frequency similar to the operations in block 1131 of the method 1101 described with reference to FIG. 11B. In some embodiments, the processor may repeat any or all of the operations in blocks 1137, 1139, and 1141 repeatedly or continuously to perform interactive controls of the moving device speed and processing system operating frequency.

Figure 11E:
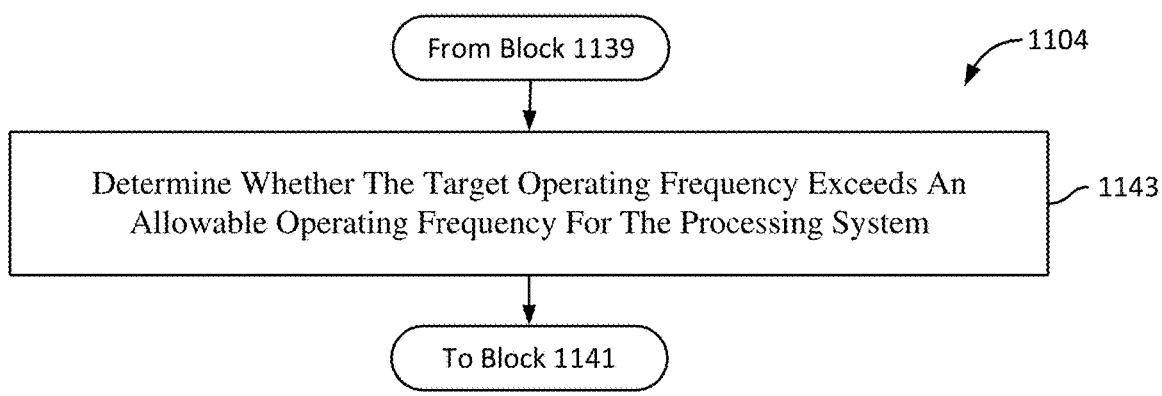

FIG. 11E illustrates method 1104 that may be performed with or as an enhancement to the method 1103 (FIG. 11D).

Referring to FIG. 11E, following the operations in block 1139 of the method 1103, the processor may determine whether the target operation frequency exceeds an allowable operating frequency for the processing system in block 1143, which may be similar to the operations in block 1125 in the method 1100) as described with reference to FIG. 11A. In some embodiments, changing the operating frequency of the processing system to the target operating frequency in block 1141 may include changing the operating frequency of the processing system to the target operating frequency in response to determining that the target operating frequency does not exceed the allowable operating frequency for the processing system. In some embodiments, changing the operating frequency of the processing system to the target operating frequency may include changing a current operating frequency of the processing system to a value less than the target operating frequency in response to determining that the target operating frequency exceeds the allowable operating frequency. Following the operations in block 1143, the processor may perform the operations in block 1141 of the method 1103 (FIG. 11D).

Figure 11F:
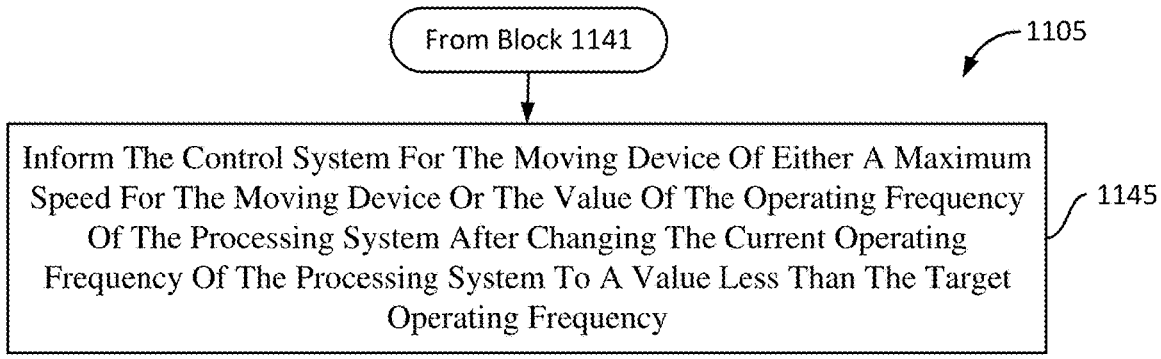

FIG. 11F illustrates method 1105 that may be performed with or as an enhancement to the method 1103 (FIG. 11D).

Referring to FIG. 11F, following the operations in block 1141 of the method 1103 (FIG. 11D), the processor may perform the operations in block 1145, including informing the control system for the moving device of either a maximum speed for the moving device or the value of the operating frequency of the processing system after changing the current operating frequency of the processing system to a value less than the target operating frequency. In block 1145, the processor of the processing system may use the allowable operating frequency transmitting module (e.g., 454). Means for performing the operations of block 1145 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

In some embodiments, the processor may repeat any or all of the operations in blocks 1137, 1139, 1141, and 1145 repeatedly or continuously to perform interactive controls of moving device speed and processing system operating frequency.

Figure 11G:
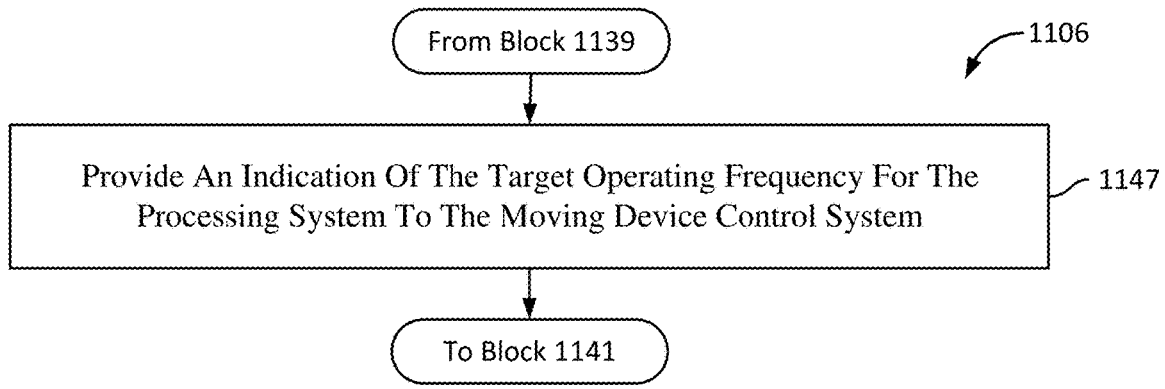

FIG. 11G illustrates method 1106 that may be performed with or as an enhancement to the method 1103 (FIG. 11D).

Referring to FIG. 11G, following the operations in block 1139 of the method 1103 (FIG. 11D), the processor may perform operations in block 1147 including providing an indication of the target operating frequency for the processing system to the moving device control system. In block 1147, the processor of the processing system may use the allowable operating frequency transmitting module (e.g., 454). Means for performing the operations of block 1147 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

Following the operations in block 1147, the processor may perform the operations in block 1141 of the method 1103 (FIG. 11D).

Figure 11H:
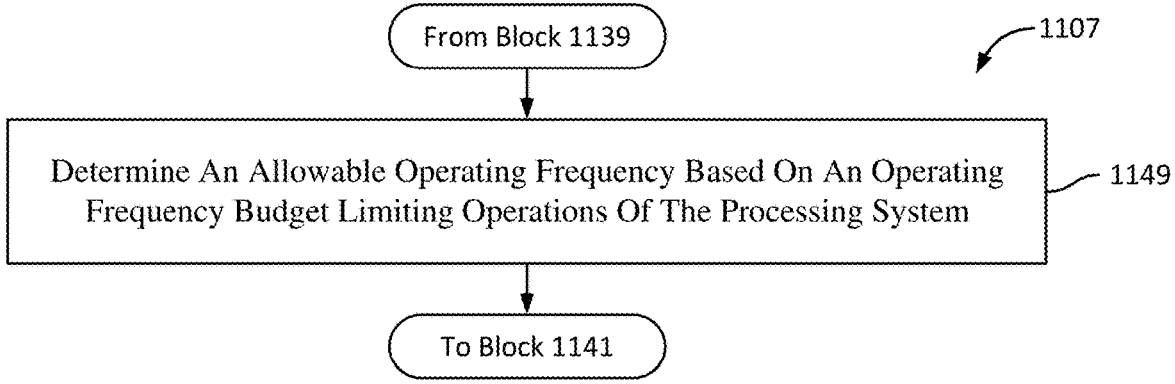

FIG. 11H illustrates method 1107 that may be performed with or as an enhancement to the method 1103 (FIG. 11D).

Referring to FIG. 11H, following the operations in block 1139 of the method 1103 (FIG. 11D), the processor may perform the operations in block 1149, including determining an allowable operating frequency based on an operating frequency budget limiting operations of the processing system analogous to the operations in block 1135 the method 1102 as described with reference to FIG. 11C. Following the operations in block 1149, the processor may perform the operations in block 1141 of the method 1103 (FIG. 11D).

Figure 11I:
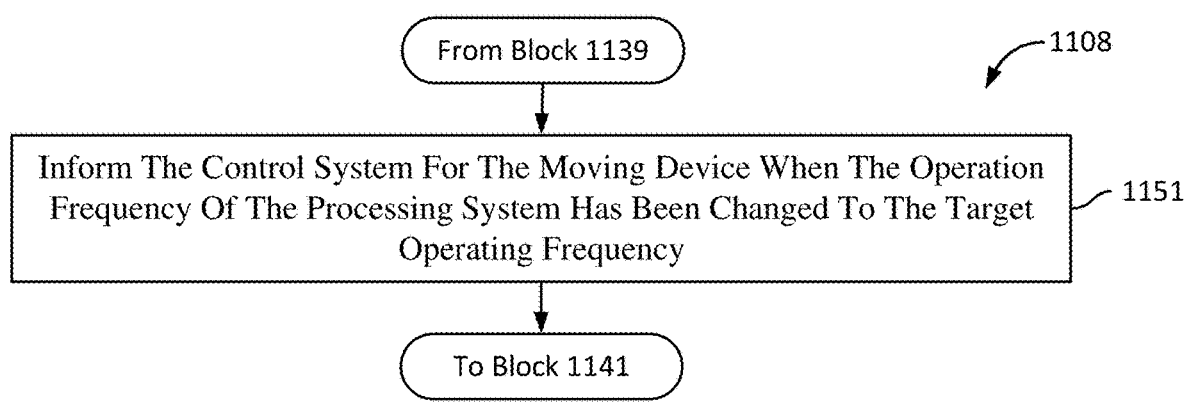

FIG. 11I illustrates method 1108 that may be performed with or as an enhancement to the method 1103 (FIG. 11D).

Referring to FIG. 11I, following the operations in block 1139 of the method 1103 (FIG. 11D), the processor may perform the operations in block 1151 including informing the control system for the moving device when the operation frequency of the processing system has been changed to the target operating frequency. In some embodiments, receiving an indication of a speed of the moving device in block 1137 of the method 1103 (FIG. 11D) may include receiving an indication of a required or requested speed of the moving device. In some embodiments, determining a target operating frequency for the processing system compatible with the indicated speed of the moving device block 1139 of the method 1103 (FIG. 11D) may include determining a target operating frequency of the processing system that will support the required or requested speed of the moving device. In block 1151, the processor of the processing system may use the allowable operating frequency transmitting module (e.g., 454). Means for performing the operations of block 1151 may include a transceiver (e.g., 159), a processor (e.g., 210, 212, 214, 216, 218, 252, 260, 141, 151) of a processing system (e.g., 150) that may use the memory (e.g., 143, 153, 220, 258), external resources 420, and/or one or more other components of the control system 140 and/or the processing system 150.

Following the operations in block 1151, the processor may perform the operations in block 1141 of the method 1103 (FIG. 11D).

Figure 12:
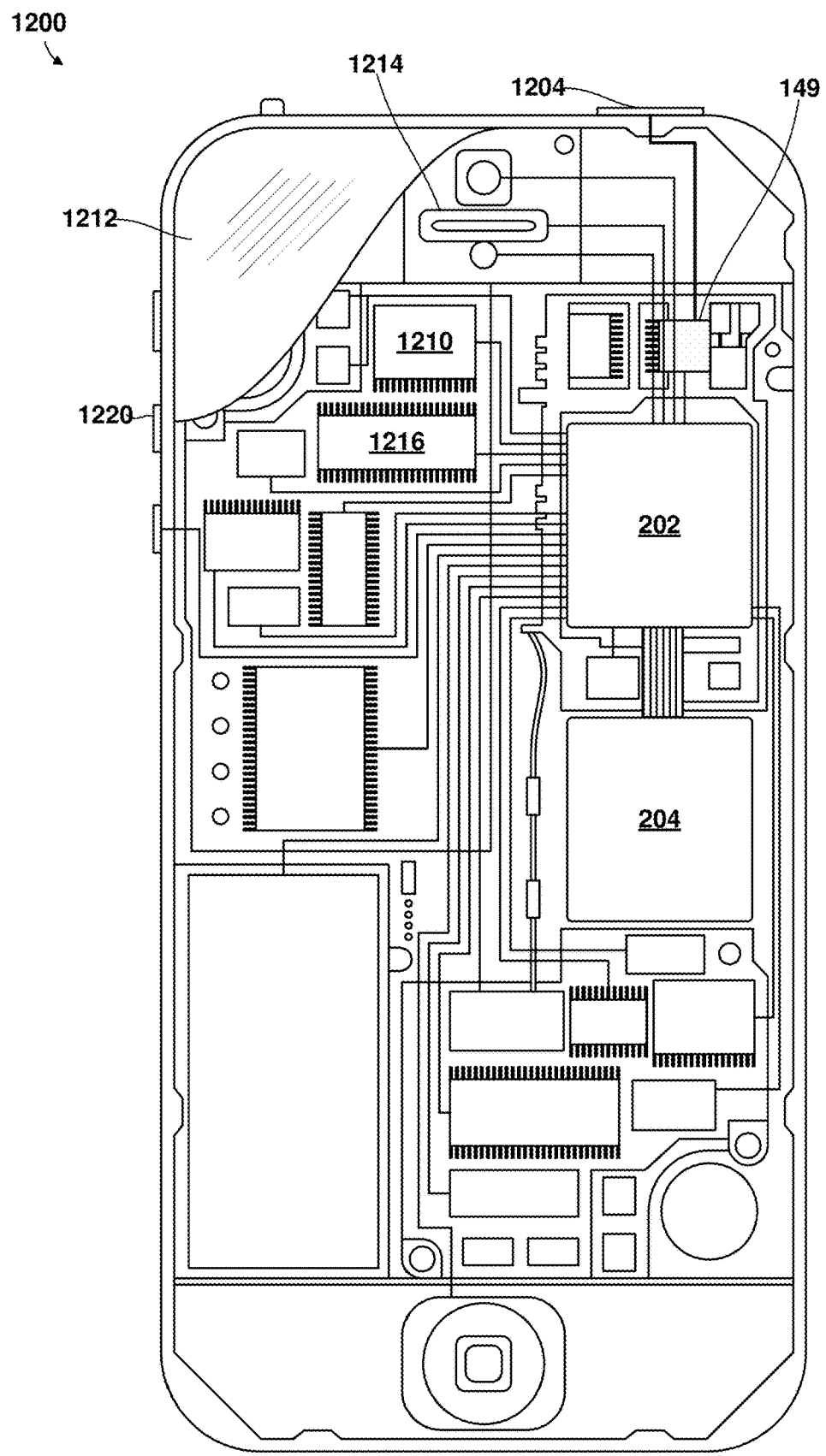
FIG. 12 is a component block diagram of a mobile computing device suitable for use with various embodiments.

FIG. 12 is a component block diagram of a wireless device 1200 suitable for use with various embodiments. With reference to FIGS. 1A-12, various embodiments may be implemented on a variety of wireless devices 1200 (for example, the moving device 110*f*), an example of which is illustrated in FIG. 12 in the form of a smartphone. The wireless device 1200 may include a first SOC 202 (for example, a SOC-CPU) coupled to a second SOC 204 (for example, a 5G capable SOC). The first and second SOCs 202, 204 may be coupled to internal memory 1216, a display 1212, and to a speaker 1214. Additionally, the wireless device 1200 may include an antenna 1204 for sending and receiving electromagnetic radiation that may be connected to a wireless data link or cellular network transceiver 149 coupled to one or more processors in the first and/or second SOCs 202, 204. Wireless device 1200 also may include menu selection buttons or rocker switches 1220 for receiving user inputs.

The wireless device 1200 wireless device 1200 may include a sound encoding/decoding (CODEC) circuit 1210, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 149 and CODEC 1210 may include a digital signal processor (DSP) circuit (not shown separately).

Figure 13:
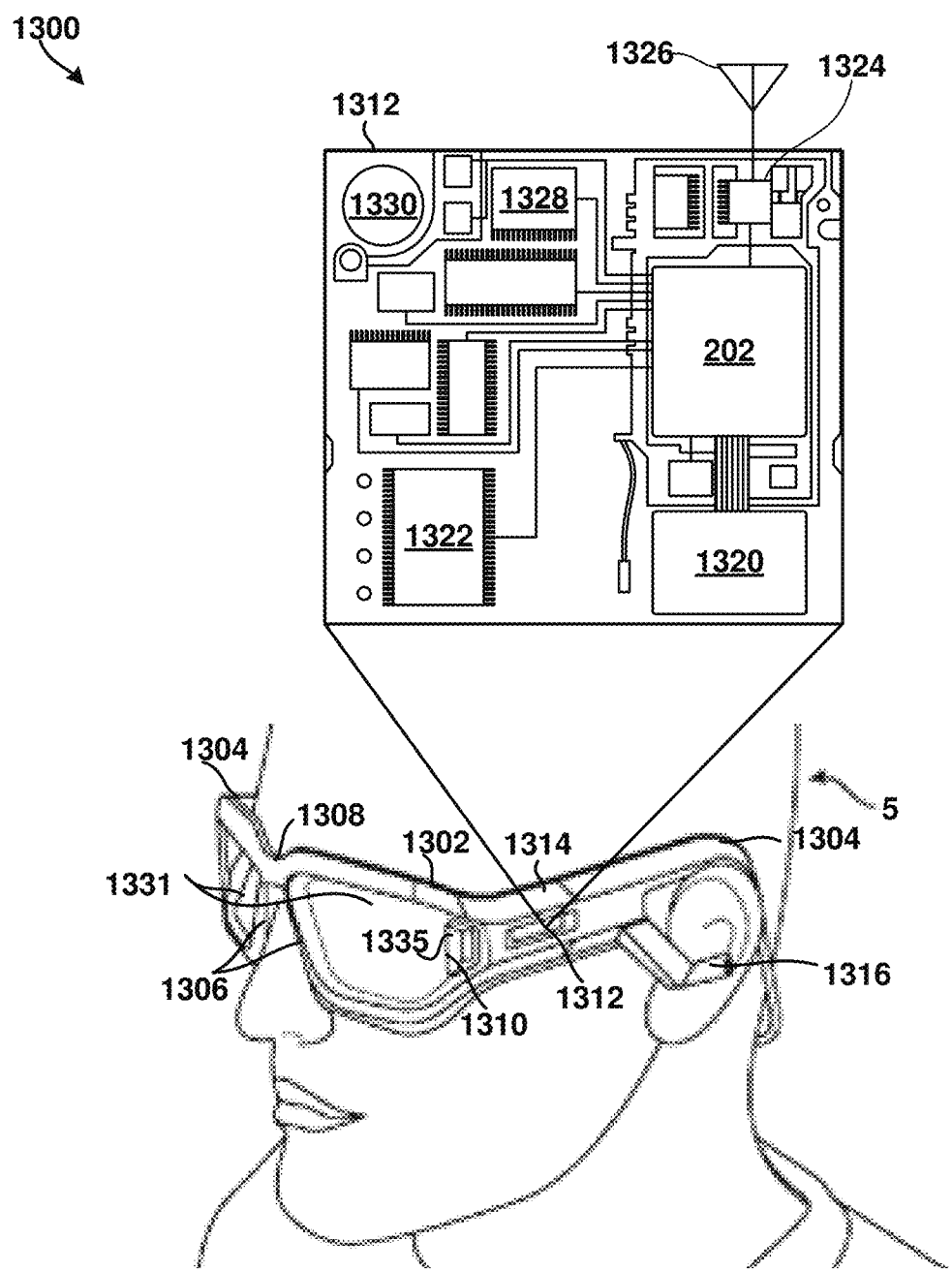
FIG. 13 is a component block diagram of a(n) AR/VR headset suitable for use with various embodiments.

Various embodiments (including embodiments discussed above with reference to FIGS. 1A-11C) may be implemented on a variety of wearable devices, an example of which is illustrated in FIG. 13 in the form of smart glasses 1300. With reference to FIGS. 1A-13, the smart glasses 1300 may operate like conventional eye glasses, but with enhanced computer features and sensors, like a built-in camera 1335 and heads-up display or augmented reality features on or near the lenses 1331. Like any glasses, smart glasses may include a frame 1302 coupled to temples 1304 that fit alongside the head and behind the ears of a wearer. The frame 1302 holds the lenses 1331 in place before the wearer's eyes when nose pads 1306 on the bridge 1308 rest on the wearer's nose.

In some embodiments, smart glasses 1300 may include an image rendering device 1314 (e.g., an image projector), which may be embedded in one or both temples 1304 of the frame 1302 and configured to project images onto the optical lenses 1331. In some embodiments, the image rendering device 1314 may include a light-emitting diode (LED) module, a light tunnel, a homogenizing lens, an optical display, a fold mirror, or other components well known projectors or head-mounted displays. In some embodiments (e.g., those in which the image rendering device 1314 is not included or used), the optical lenses 1331 may be, or may include, see-through or partially see-through electronic displays. In some embodiments, the optical lenses 1331 include image-producing elements, such as see-through Organic Light-Emitting Diode (OLED) display elements or liquid crystal on silicon (LCOS) display elements. In some embodiments, the optical lenses 1331 may include independent left-eye and right-eye display elements. In some embodiments, the optical lenses 1331 may include or operate as a light guide for delivering light from the display elements to the eyes of a wearer.

The smart glasses 130 may include a number of external sensors that may be configured to obtain information about wearer actions and external conditions that may be useful for sensing images, sounds, muscle motions and other phenomenon that may be useful for determining an exercise being performed. In some embodiments, smart glasses 1300 may include a camera 1335 configured to image objects in front of the wearer in still images or a video stream, which may be transmitted to another computing device (e.g., a mobile device 110*f*, 1200) for analysis. In some embodiments, smart glasses 1300 may include a microphone 1310 positioned and configured to record sounds in the vicinity of the wearer. In some embodiments, multiple microphones may be positioned in different locations on the frame 1302, such as on a distal end of the temples 1304 near the jaw, to record sounds emanating from the wearer, such as jaw movements, breathing sounds, and the like. In some embodiments, smart glasses 130 may include one or more electromyograms 1316 mounted on one or both temples 1304, such as near the temples or above the ears, and configured to measure electrical activity of the nerves and muscles in the jaw and temple area of a wearer. In some embodiments, smart glasses 130 may include pressure sensors, such on the nose pads 1306, configured to sense facial movements. In some embodiments, smart glasses 130 may include other sensors (e.g., a thermometer, heart rate monitor, body temperature sensor, pulse oximeter etc.) for collecting information pertaining to the user's pulmonary condition, oxygen levels and/or user conditions that may be useful for determining the user's breathing pattern.

The processing system 1312 may include a processing and communication SOC 202, which may include one or more processors (e.g., 210, 212, 214, 216, 218, 252, 260, 141, 151), one or more of which may be configured with processor-executable instructions to perform operations of various embodiments. The processing and communication SOC 202 may be coupled to internal sensors 1320, internal memory 1322, and communication circuitry 1324 coupled one or more antenna 1326 for establishing a wireless data link with an external computing device (e.g., a mobile device 600), such as via a Bluetooth link. The processing and communication SOC 202 may also be coupled to sensor interface circuitry 1328 configured to control and received data from a camera 1335, microphone(s) 1310, one or more electromyograms 1316, and other sensors positioned on the frame 1302.

The internal sensors 1320 may include an inertial measurement unit (IMU) that includes electronic gyroscopes, accelerometers, and a magnetic compass configured to measure movements and orientation of the wearer's head. The internal sensors 1320 may further include a magnetometer, an altimeter, an odometer, and an atmospheric pressure sensor, as well as other sensors useful for determining the orientation and motions of the smart glasses 130. Such sensors may be useful in various embodiments for detecting head motions associated with consuming liquids as described.

The processing system 1312 may further include a power source such as a rechargeable battery 1330 coupled to the SOC 202 as well as the external sensors on the frame 1302.

Figure 14:
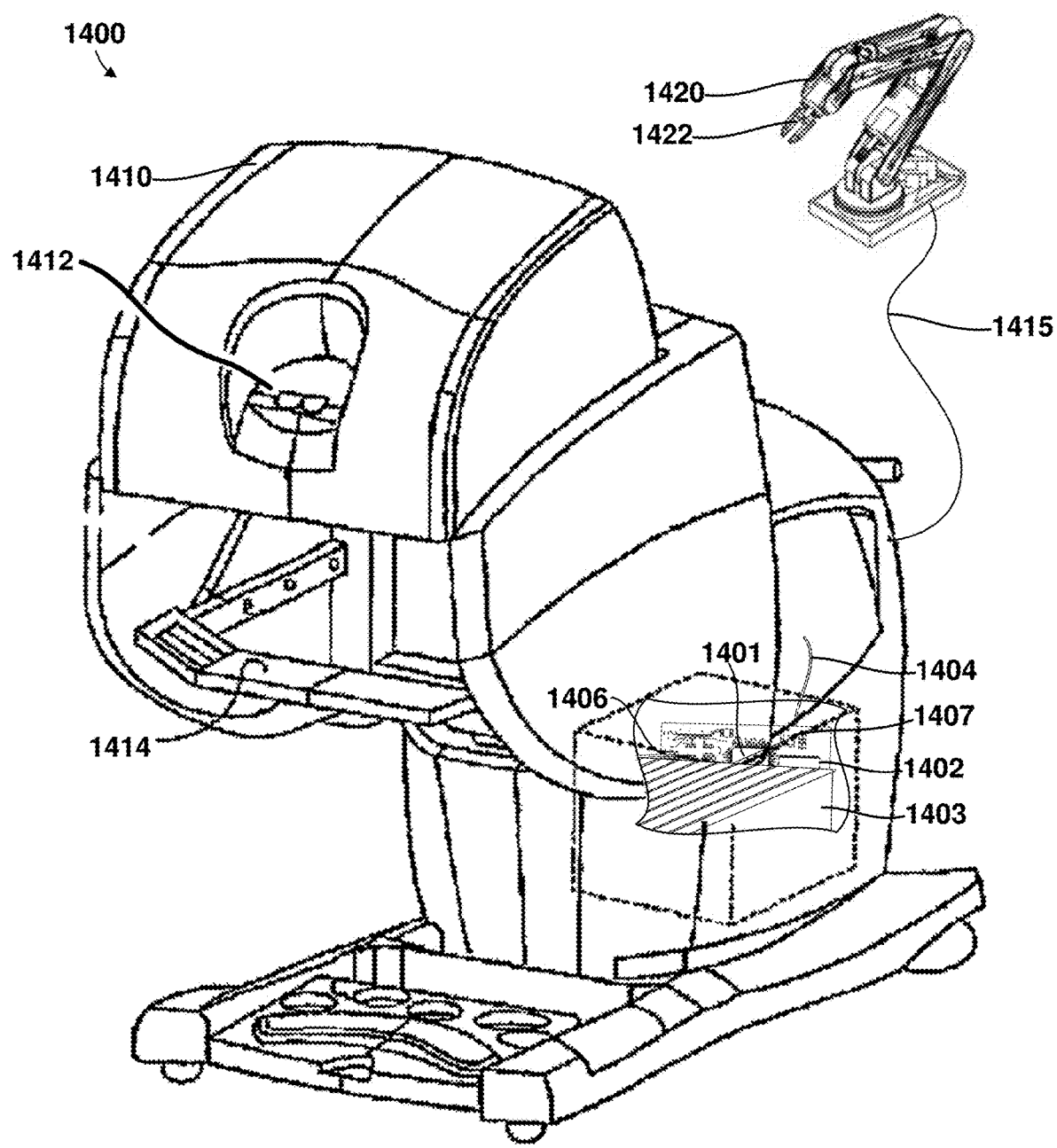
FIG. 14 is a component block diagram of a remotely controlled robotic device suitable for use with various embodiments.

Various embodiments (including, but not limited to, embodiments discussed above with reference to FIGS. 1A-11C) may be implemented on a variety of moving devices, an example of which is illustrated in FIG. 14 in the form of a surgical robot. With reference to FIGS. 1A-14, the surgical robot 1400 may include a control system 1410 and a processing system 1420 that includes one or more robotic arm(s). The control system 1410 may include a user interface, such as a user display 1412 and operating interface 1414. The processing system may be coupled to the control system 1410 through a bi-direction communication link 1415. The robotic arm(s) may include sensors 1422 for detecting orientation, position, and pressure being applied. The surgical robot 1400 may include a processor 1401 coupled to volatile memory 1402 and a large capacity nonvolatile memory, such as a disk drive 1403. The surgical robot 1400 may also include a peripheral memory access device such as a floppy disc drive, compact disc (CD) or digital video disc (DVD) drive 1406 coupled to the processor 1401. The surgical robot 1400 may also include network access ports 1404 (or interfaces) coupled to the processor 1401 for establishing data connections with a network, such as the Internet and/or a local area network coupled to other system computers and servers. The surgical robot 1400 may include one or more antennas 1407 for sending and receiving electromagnetic radiation that may be connected to a communication link. The surgical robot 1400 may include additional access ports, such as USB, Firewire, Thunderbolt, and the like for coupling to peripherals, external memory, or other devices.

Implementation examples are described in the following paragraphs. While some of the following implementation examples are described in terms of example methods, further example implementations may include: the example methods discussed in the following paragraphs implemented by a processing system of a moving device configured to interact with a control system including a processor configured with processor-executable instructions to perform operations of the methods of the following implementation examples; the example methods discussed in the following paragraphs implemented by a control system configured to interact with a processing system of a moving device including a processor configured with processor-executable instructions to perform operations of the methods of the following implementation examples; the example methods discussed in the following paragraphs implemented by a processing system or a control system of a moving device including means for performing functions of the methods of the following implementation examples; and the example methods discussed in the following paragraphs may be implemented as a non-transitory processor-readable storage medium having stored thereon processor-executable instructions configured to cause a processor of a processing system or a control system of a moving device to perform the operations of the methods of the following implementation examples.

Example 1. A method performed by a moving device control system interacting with a processing system, including: transmitting a processing latency requirement indication to an operating frequency controller of a moving device processing system; receiving an indication of an allowable operating frequency for the processing system in response to the transmitted processing latency requirement indication; and changing a characteristic of movement of a moving device based on the received indication of the allowable operating frequency.

Example 2. The method performed by a moving device control system interacting with a processing system of claim 1, further including determining a change in the characteristic of movement of the moving device that requires a change in a current processing latency of the operating frequency controller, in which the transmitted processing latency requirement indication reflects the determined change in the characteristic of movement of the moving device.

Example 3. The method performed by a moving device control system interacting with a processing system of either of claims 1 or 2, further including receiving at least one of a moving device target speed or remote object current speed, in which the determined change in the characteristic of movement of the moving device control system is based on the received at least one of the moving device control system target speed or the remote object current speed.

Example 4. The method performed by a moving device control system interacting with a processing system of any of claims 1-3, in which the transmitted processing latency requirement indication correlates to a target speed of the moving device.

Example 5. The method performed by a moving device control system interacting with a processing system of any of claims 1-4, in which changing the characteristic of movement of the moving device includes changing a speed of the moving device to a target speed associated with the received indication of the allowable operating frequency.

Example 6. The method performed by a moving device control system interacting with a processing system of any of claims 1-5, in which the received indication of the allowable operating frequency is configured to limit a maximum speed for the moving device.

Example 7. The method performed by a moving device control system interacting with a processing system of any of claims 1-6, in which the transmitted processing latency requirement indication includes a latency requirement vote requesting a minimum latency from the processing system.

Example 8. A method performed by a processing system interacting with a control system of a moving device, including: receiving an indication of a processing latency requirement from a moving device control system; determining a target operating frequency to achieve the processing latency requirement; determining whether the target operating frequency exceeds an allowable operating frequency for the processing system; and transmitting an indication of the allowable operating frequency for the processing system to the moving device control system.

Example 9. The method performed by a processing system interacting with a control system of a moving device of claim 8, further including: changing an operating frequency of the processing system to the target operating frequency in response to determining that the target operating frequency does not exceed the allowable operating frequency; and changing a current operating frequency of the processing system to a value below that of the target operating frequency in response to determining that the target operating frequency exceeds the allowable operating frequency.

Example 10. The method performed by a processing system interacting with a control system of a moving device of any of claims 8 or 9, in which the received indication of the processing latency requirement correlates to a target speed of the moving device.

Example 11. The method performed by a processing system interacting with a control system of a moving device of any of claims 8-10, in which the transmitted indication of the allowable operating frequency is configured to direct the moving device control system to lower a target movement speed of the moving device.

Example 12. The method performed by a processing system interacting with a control system of a moving device of any of claims 8-11, in which the transmitted indication of the allowable operating frequency is configured to limit a maximum movement speed of the moving device.

Example 13. The method performed by a processing system interacting with a control system of a moving device of any of claims 8-12, in which the received indication of the processing latency requirement includes a latency requirement vote requesting a minimum latency from the processing system.

Example 14. The method performed by a processing system interacting with a control system of a moving device of any of claims 8-13, further including determining the allowable operating frequency based on an operating frequency budget limiting operations of the processing system, in which the allowable operating frequency for the processing system is based on at least one of a thermal, power, or load output limit of the processing system.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA 1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, data, signaling, and/or content messages. It should be understood that any references to terminology and/or technical details related to an individual telecommunication standard or technology are for illustrative purposes only and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next." etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable and processor-readable storage media may include RAM, ROM, EEPROM. FLASH memory. CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method performed by a moving device control system interacting with a processing system, comprising:
   transmitting a processing latency requirement indication to an operating frequency controller of a moving device processing system;
   receiving an indication of an allowable operating frequency for the processing system in response to the transmitted processing latency requirement indication; and
   changing a characteristic of movement of a moving device based on the received indication of the allowable operating frequency.

2. The method of claim 1, further comprising:
   determining a change in the characteristic of movement of the moving device that requires a change in a current processing latency of the operating frequency controller, wherein the transmitted processing latency requirement indication reflects the determined change in the characteristic of movement of the moving device.

3. The method of claim 2, further comprising:
   receiving at least one of a moving device target speed or remote object current speed, wherein the determined change in the characteristic of movement of the moving device control system is based on the received at least one of the moving device control system target speed or the remote object current speed.

4. The method of claim 1, wherein the transmitted processing latency requirement indication correlates to a target speed of the moving device.

5. The method of claim 1, wherein changing the characteristic of movement of the moving device includes changing a speed of the moving device to a target speed associated with the received indication of the allowable operating frequency.

6. The method of claim 1, wherein the received indication of the allowable operating frequency is configured to limit a maximum speed for the moving device.

7. The method of claim 1, wherein the transmitted processing latency requirement indication includes a latency requirement vote requesting a minimum latency from the processing system.

8. A control system of a moving device configured to interact with a processing system, comprising:
one or more sensors; and
a processor coupled to the one or more sensors and configured with processor-executable instructions to:
transmit a processing latency requirement indication to an operating frequency controller of a moving device processing system;
receive an indication of an allowable operating frequency for the processing system in response to the transmitted processing latency requirement indication; and
change a characteristic of movement of the moving device based on the received indication of the allowable operating frequency.

9. The control system of claim 8, wherein the processor is further configured with processor-executable instructions to:
determine a change in the characteristic of movement of the moving device that requires a change in a current processing latency of the operating frequency controller, wherein the transmitted processing latency requirement indication reflects the determined change in the characteristic of movement of the moving device.

10. The control system of claim 9, wherein the processor is further configured with processor-executable instructions to:
receive at least one of a moving device target speed or remote object current speed; and
determine the change in the characteristic of movement of a moving device control system based on the received at least one of the moving device control system target speed or the remote object current speed.

11. The control system of claim 8, wherein the processor is further configured with processor-executable instructions such that the transmitted processing latency requirement indication correlates to a target speed of the moving device.

12. The control system of claim 8, wherein the processor is further configured with processor-executable instructions to change the characteristic of movement of the moving device by changing a speed of the moving device to a target speed associated with the received indication of the allowable operating frequency.

13. The control system of claim 8, wherein the processor is further configured with processor-executable instructions such that the transmitted processing latency requirement indication includes a latency requirement vote requesting a minimum latency from the processing system.

14. A control system, comprising:
means for transmitting a processing latency requirement indication to an operating frequency controller of a moving device processing system;
means for receiving an indication of an allowable operating frequency for a processing system in response to the transmitted processing latency requirement indication; and
means for changing a characteristic of movement of a moving device based on the received indication of the allowable operating frequency.

15. The control system of claim 14, further comprising:
means for determining a change in the characteristic of movement of the moving device that requires a change in a current processing latency of the operating frequency controller, wherein the transmitted processing latency requirement indication reflects the determined change in the characteristic of movement of the moving device.

16. The control system of claim 15, further comprising:
means for receiving at least one of a moving device target speed or remote object current speed,
wherein means for determining a change in the characteristic of movement of the moving device that requires a change in a current processing latency of the operating frequency controller comprises determining a change in the characteristic of movement of the moving device based on the received at least one of the moving device control system target speed or the remote object current speed.

17. The control system of claim 14, wherein means for changing a characteristic of movement of a moving device based on the received indication of the allowable operating frequency comprises means for changing a speed of the moving device to a target speed associated with the received indication of the allowable operating frequency.

18. The control system of claim 14, wherein means for transmitted a processing latency requirement indication comprises means for transmitted a processing latency requirement indication that includes a latency requirement vote requesting a minimum latency from the processing system.

19. A non-transitory processor-readable medium having stored thereon processor-executable instructions configured to cause a processor of a control system to interact with a processing system by performing operations comprising:
transmitting a processing latency requirement indication to an operating frequency controller of a moving device processing system;
receiving an indication of an allowable operating frequency for the processing system in response to the transmitted processing latency requirement indication; and
changing a characteristic of movement of a moving device based on the received indication of the allowable operating frequency.

20. A method performed by a processing system interacting with a control system of a moving device, comprising:
receiving an indication of a processing latency requirement from a moving device control system;
determining a target operating frequency to achieve the processing latency requirement;
determining whether the target operating frequency exceeds an allowable operating frequency for the processing system; and
transmitting an indication of the allowable operating frequency for the processing system to the moving device control system.

21. The method of claim 20, further comprising:
changing an operating frequency of the processing system to the target operating frequency in response to determining that the target operating frequency does not exceed the allowable operating frequency; and
changing a current operating frequency of the processing system to a value below that of the target operating frequency in response to determining that the target operating frequency exceeds the allowable operating frequency.

22. The method of claim 20, wherein the received indication of the processing latency requirement correlates to a target speed of the moving device.

23. The method of claim 20, wherein the transmitted indication of the allowable operating frequency is configured to direct the moving device control system to lower a target movement speed of the moving device.

24. The method of claim 20, wherein the transmitted indication of the allowable operating frequency is configured to limit a maximum movement speed of the moving device.

25. The method of claim 20, wherein:
the received indication of the processing latency requirement includes a latency requirement vote requesting a minimum latency from the processing system.

26. The method of claim 20, further comprising:
determining the allowable operating frequency based on an operating frequency budget limiting operations of the processing system, wherein the operating frequency budget is based on at least one of a thermal, power, or load output limit of the processing system.

27. A processing system of a moving device configured to interact with a control system, comprising:
one or more sensors; and
a processor coupled to the one or more sensors and configured with processor-executable instructions to:
receive an indication of a processing latency requirement from a moving device control system,
determine a target operating frequency to achieve the processing latency requirement,
determine whether the target operating frequency exceeds an allowable operating frequency for the processing system, and
transmit an indication of the allowable operating frequency for the processing system to the moving device control system.

28. The processing system of claim 27, wherein the processor is further configured with processor-executable instructions to:
change an operating frequency of the processing system to the target operating frequency in response to determining that the target operating frequency does not exceed the allowable operating frequency; and
change a current operating frequency of the processing system to a value below that of the target operating frequency in response to determining that the target operating frequency exceeds the allowable operating frequency.

29. The processing system of claim 27, wherein the processor is further configured with processor-executable instructions to determine the target operating frequency based a target speed of the moving device communicated in the received processing latency requirement indication.

30. The processing system of claim 27, wherein the processor is further configured with processor-executable instructions to transmit an indication of the allowable operating frequency configured to direct the moving device control system to lower a target movement speed of the moving device.

31. The processing system of claim 27, wherein the processor is further configured with processor-executable instructions to transmit an indication of the allowable operating frequency configured to limit a maximum movement speed of the moving device.

32. The processing system of claim 27, wherein the processor is further configured with processor-executable instructions to determine the target operating frequency based on a latency requirement vote requesting a minimum latency from the processing system included in the received processing latency requirement indication.

33. The processing system of claim 27, wherein the processor is further configured with processor-executable instructions to:
determine the allowable operating frequency based on an operating frequency budget limiting operations of the processing system; and
wherein determining the target operating frequency is based on the determined allowable operating frequency.

34. A processing system, comprising:
means for receiving an indication of a processing latency requirement from a moving device control system;
means for determining a target operating frequency to achieve the processing latency requirement;
means for determining whether the target operating frequency exceeds an allowable operating frequency for the processing system; and
means for transmitting an indication of the allowable operating frequency for the processing system to the moving device control system.

35. The processing system of claim 34, further comprising:
means for changing an operating frequency of the processing system to the target operating frequency in response to determining that the target operating frequency does not exceed the allowable operating frequency; and
means for changing a current operating frequency of the processing system to a value below that of the target operating frequency in response to determining that the target operating frequency exceeds the allowable operating frequency.

36. The processing system of claim 34, wherein means for transmitting an indication of the allowable operating frequency comprises means for transmitting an indication configured to limit a maximum movement speed of a moving device.

37. The processing system of claim 34, wherein means for determining a target operating frequency to achieve the processing latency requirement comprises means for determining the target operating frequency based on a latency requirement vote requesting a minimum latency from the processing system included in the received processing latency requirement indication.

38. The processing system of claim 34, further comprising:
means for determining the allowable operating frequency based on an operating frequency budget limiting operations of the processing system; and
wherein means for determining the target operating frequency use the determined allowable operating frequency.

39. A non-transitory processor-readable medium having stored thereon processor-executable instructions configured to cause a processor of a processing system to interact with a control system by performing operations comprising:
receiving an indication of a processing latency requirement from a moving device control system;
determining a target operating frequency to achieve the processing latency requirement;
determining whether the target operating frequency exceeds an allowable operating frequency for the processing system; and
transmitting an indication of the allowable operating frequency for the processing system to the moving device control system.

40. A method performed by a processing system interacting with a control system of a moving device, comprising:
receiving an indication of a speed of the moving device;
determining a target operating frequency for the processing system compatible with the indicated speed of the moving device; and changing an operating frequency of the processing system to the target operating frequency.

41. The method of claim 40, further comprising:
determining whether the target operating frequency exceeds an allowable operating frequency for the processing system,
wherein changing the operating frequency of the processing system to the target operating frequency comprises:
changing the operating frequency of the processing system to the target operating frequency in response to determining that the target operating frequency does not exceed the allowable operating frequency for the processing system, and
changing a current operating frequency of the processing system to a value less than the target operating frequency in response to determining that the target operating frequency exceeds the allowable operating frequency.

42. The method of claim 41, further comprising informing the control system for the moving device of either a maximum speed for the moving device or the value of the operating frequency of the processing system after changing the current operating frequency of the processing system to a value less than the target operating frequency.

43. The method of claim 40, wherein receiving an indication of a speed of the moving device comprises receiving a processing latency value for the processing system.

44. The method of claim 40, further comprising:
providing an indication of the target operating frequency for the processing system to the moving device control system.

45. The method of claim 40, wherein receiving an indication of a speed of the moving device comprises receiving a latency requirement vote requesting a minimum latency from the processing system.

46. The method of claim 40, further comprising:
determining an allowable operating frequency based on an operating frequency budget limiting operations of the processing system, wherein the operating frequency budget is based on at least one of a thermal, power, or load output limit of the processing system.

47. The method of claim 40, wherein:
receiving an indication of a speed of the moving device comprises receiving an indication of a required or requested speed of the moving device;
determining a target operating frequency for the processing system compatible with the indicated speed of the moving device comprises determining a target operating frequency of the processing system that will support the required or requested speed of the moving device; and
the method further comprises informing the control system for the moving device when the operation frequency of the processing system has been changed to the target operating frequency.

48. A control system of a moving device configured to interact with a processing system, comprising:
a processor configured to:
receive an indication of a speed of the moving device;
determine a target operating frequency for the processing system compatible with the indicated speed of the moving device; and
change an operating frequency of the processing system to the target operating frequency.

49. The control system of claim 48, wherein:
the processor is further configured to determine whether the target operating frequency exceeds an allowable operating frequency for the processing system;
the processor is further configured to change the operating frequency of the processing system to the target operating frequency by:
changing the operating frequency of the processing system to the target operating frequency in response to determining that the target operating frequency does not exceed the allowable operating frequency for the processing system, and
changing a current operating frequency of the processing system to a value less than the target operating frequency in response to determining that the target operating frequency exceeds the allowable operating frequency.

50. The control system of claim 49, wherein the processor is further configured to inform the control system for the moving device of either a maximum speed for the moving device or the value of the operating frequency of the processing system after changing the current operating frequency of the processing system to a value less than the target operating frequency.

51. The control system of claim 48, wherein the processor is further configured to receive an indication of a speed of the moving device by receiving a processing latency value for the processing system.

52. The control system of claim 48, wherein the processor is further configured to provide an indication of the target operating frequency for the processing system to the moving device control system.

53. The control system of claim 48, wherein the processor is further configured with to receive an indication of a speed of the moving device by receiving a latency requirement vote requesting a minimum latency from the processing system.

54. The control system of claim 48, wherein the processor is further configured to determine an allowable operating frequency based on an operating frequency budget limiting operations of the processing system, wherein the operating frequency budget is based on at least one of a thermal, power, or load output limit of the processing system.

55. The control system of claim 48, wherein the processor is further configured to:
receive an indication of a speed of the moving device by receiving an indication of a required or requested speed of the moving device;
determine a target operating frequency for the processing system compatible with the indicated speed of the moving device by determining a target operating frequency of the processing system that will support the required or requested speed of the moving device; and
inform the control system for the moving device when the operation frequency of the processing system has been changed to the target operating frequency.

56. A control system, comprising:
means for receiving an indication of a speed of a moving device;
means for determining a target operating frequency for a processing system that is compatible with the indicated speed of the moving device; and
means for changing an operating frequency of the processing system to the target operating frequency.

57. The control system of claim 56, further comprising:
means for determining whether the target operating frequency exceeds an allowable operating frequency for the processing system, wherein means for changing the operating frequency of the processing system to the target operating frequency comprises:
  means for changing the operating frequency of the processing system to the target operating frequency in response to determining that the target operating frequency does not exceed the allowable operating frequency for the processing system, and
  means for changing a current operating frequency of the processing system to a value less than the target operating frequency in response to determining that the target operating frequency exceeds the allowable operating frequency.

58. The control system of claim 57, further comprising means for informing the control system for the moving device of either a maximum speed for the moving device or the value of the operating frequency of the processing system after changing the current operating frequency of the processing system to a value less than the target operating frequency.

59. The control system of claim 56, wherein means for receiving an indication of a speed of the moving device comprises means for receiving a processing latency value for the processing system.

60. The control system of claim 56, further comprising:
  means for providing an indication of the target operating frequency for the processing system to the moving device control system.

61. The control system of claim 56, wherein means for receiving an indication of a speed of the moving device comprises means for receiving a latency requirement vote requesting a minimum latency from the processing system.

62. The control system of claim 56, further comprising:
  means for determining an allowable operating frequency based on an operating frequency budget limiting operations of the processing system, wherein the operating frequency budget is based on at least one of a thermal, power, or load output limit of the processing system.

63. The control system of claim 56, wherein:
  means for receiving an indication of a speed of the moving device comprises means for receiving an indication of a required or requested speed of the moving device; and
  means for determining a target operating frequency for the processing system compatible with the indicated speed of the moving device comprises means for determining a target operating frequency of the processing system that will support the required or requested speed of the moving device,
  the control system further comprising means for informing the control system for the moving device when the operation frequency of the processing system has been changed to the target operating frequency.

64. A non-transitory processor-readable medium having stored thereon processor-executable instructions configured to cause a processor of a control system to interact with a processing system of a moving device by performing operations comprising:
  receiving an indication of a speed of the moving device;
  determining a target operating frequency for the processing system compatible with the indicated speed of the moving device; and
  changing an operating frequency of the processing system to the target operating frequency.

* * * * *